(12) United States Patent
Kirillov

(10) Patent No.: US 11,561,287 B2
(45) Date of Patent: Jan. 24, 2023

(54) LIDAR SENSORS AND METHODS FOR THE SAME

(71) Applicant: Infineon Technologies AG, Neubiberg (DE)

(72) Inventor: Boris Kirillov, Judendorf-Strassenge (AT)

(73) Assignee: Infineon Technologies AG, Neubiberg (DE)

( * ) Notice: Subject to any disclaimer, the term of this patent is extended or adjusted under 35 U.S.C. 154(b) by 384 days.

(21) Appl. No.: 16/807,778

(22) Filed: Mar. 3, 2020

(65) Prior Publication Data

US 2020/0284882 A1    Sep. 10, 2020

(30) Foreign Application Priority Data

Mar. 5, 2019   (DE) .......................... 102019105478.8

(51) Int. Cl.
  *G01S 7/481*  (2006.01)
  *G01S 17/10*  (2020.01)
  *G01S 7/484*  (2006.01)

(52) U.S. Cl.
  CPC ............ *G01S 7/4817* (2013.01); *G01S 7/484* (2013.01); *G01S 7/4815* (2013.01); *G01S 7/4816* (2013.01); *G01S 17/10* (2013.01)

(58) Field of Classification Search
  CPC .... G01S 7/4817; G01S 7/4815; G01S 7/4816; G01S 7/484; G01S 17/10; G01S 17/42; G01S 17/894; G01S 17/08; G01S 7/481
  See application file for complete search history.

(56) References Cited

U.S. PATENT DOCUMENTS

| 2017/0269197 A1* | 9/2017 | Hall ........................ G01S 17/89 |
| 2018/0059221 A1* | 3/2018 | Slobodyanyuk ...... G01S 7/4814 |
| 2018/0113200 A1* | 4/2018 | Steinberg ................ G01S 17/42 |
| 2018/0188359 A1* | 7/2018 | Droz ....................... G01S 17/42 |
| 2019/0235064 A1* | 8/2019 | Droz ....................... G01S 17/86 |
| 2019/0369256 A1* | 12/2019 | Shotan .................. G01S 7/4972 |

* cited by examiner

*Primary Examiner* — Jared Walker
(74) *Attorney, Agent, or Firm* — Harrity & Harrity, LLP

(57) ABSTRACT

A Light Detection And Ranging (LIDAR) sensor is provided. The LIDAR sensor includes an optical transmitter configured to, when operated in a first operation mode, illuminate first sub-regions of a field of view for one-dimensionally scanning the environment in the field of view. When operated in a second operation mode, the optical transmitter is configured to illuminate second sub-regions of the field of view for scanning the environment in a portion of the field of view. A second illumination intensity used for illuminating the second sub-regions is higher than a first illumination intensity used for illuminating the first sub-regions. The LIDAR sensor further includes an optical receiver configured to receive reflections from the first sub-regions and the second sub-regions.

41 Claims, 13 Drawing Sheets

LIDAR SENSORS AND METHODS FOR THE SAME

RELATED APPLICATION

This application claims priority to German Patent No. 102019105478.8, filed on Mar. 5, 2019, which is incorporated herein by reference in its entirety.

FIELD

The present disclosure relates to Light Detection And Ranging (LIDAR). In particular, examples relate to LIDAR sensors and methods for the same.

BACKGROUND

A variety of different LIDAR systems using concepts such as Flash LIDAR, one-dimensional scanning LIDAR or two-dimensional scanning LIDAR are available in the market. The individual concepts have respective disadvantages such as low light intensity, low range, or low frame rate.

SUMMARY

Hence, there may be a demand for improved LIDAR techniques.

The demand may be satisfied by the subject matter of the appended claims.

An example relates to a LIDAR sensor. The LIDAR sensor comprises an optical transmitter configured to, when operated in a first operation mode, sequentially illuminate first sub-regions of a field of view for one-dimensionally scanning the environment in the field of view. When operated in a second operation mode, the optical transmitter is configured to illuminate second sub-regions of the field of view for scanning the environment in a portion of the field of view. A second illumination intensity used for illuminating the second sub-regions is higher than a first illumination intensity used for illuminating the first sub-regions. The LIDAR sensor further comprises an optical receiver configured to receive reflections from the first and second sub regions.

Another example relates to a method for a LIDAR sensor. The method comprises sequentially illuminating first sub-regions of a field of view in a first operation mode for one-dimensionally scanning the environment in the field of view. Further, the method comprises illuminating second sub-regions of the field of view in a second operation mode for scanning the environment in a portion of the field of view. A second illumination intensity used for illuminating the second sub-regions is higher than a first illumination intensity used for illuminating the first sub-regions. Additionally, the method comprises receiving reflections from the first and second sub regions.

An example relates to another LIDAR sensor comprising an optical transmitter and an optical receiver. The optical transmitter and the optical receiver are configured to, when operated in a first operation mode, one-dimensionally scan the environment in a field of view. When operated in a second operation mode, the optical transmitter and the optical receiver are configured to two-dimensionally scan the environment in at least a portion of the field of view.

A further example relates to another method for a LIDAR sensor. The method comprises one-dimensionally scanning the environment in a field of view in a first operation mode. Further, the method comprises two-dimensionally scanning the environment in at least a portion of the field of view in a second operation mode.

An example relates to a further LIDAR sensor. The LIDAR sensor comprises a first reflective surface configured to oscillate about a first rotation axis. Further, the LIDAR sensor comprises a first light source configured to controllably emit first light beams via an optical system onto the first reflective surface so that the first reflective surface emits the first light beams into the environment. The LIDAR sensor comprises a second reflective surface configured to oscillate about a second rotation axis. Additionally, the LIDAR sensor comprises a second light source configured to controllably emit second light beams onto the second reflective surface so that the second reflective surface emits the second light beams via the optical system onto the first reflective surface. The first reflective surface is configured to emit the second light beams into the environment.

An example relates to a still further LIDAR sensor. The LIDAR sensor comprises a reflective surface configured to oscillate about a rotation axis. Additionally, the LIDAR sensor comprises a first light source configured to controllably emit first light beams via an optical system onto the first reflective surface so that the first reflective surface emits the first light beams into the environment. Further, the LIDAR sensor comprises a linear array of second light sources each configured to controllably emit a respective second light beam via an optical system onto the first reflective surface so that that the first reflective surface emits the second light beams into the environment.

Another example relates to a LIDAR sensor. The LIDAR sensor comprises an optical transmitter configured to, when operated in a first operation mode, simultaneously illuminate a full field of view for sensing the environment simultaneously in the full field of view. When operated in a second operation mode, the optical transmitter is configured to sequentially illuminate sub-regions of the field of view for one-dimensionally scanning the environment in a portion of the field of view. The LIDAR sensor further comprises an optical receiver configured to receive reflections from the environment.

An example relates to a further method for a LIDAR sensor. The method comprises simultaneously illuminating a full field of view in a first operation mode for sensing the environment simultaneously in the full field of view. In addition, the method comprises sequentially illuminating sub-regions of the field of view in a second operation mode for one-dimensionally scanning the environment in a portion of the field of view. The method further comprises receiving reflections from the environment.

Further, an example relates to a LIDAR sensor comprising a first light source configured to controllably emit light into a full field of view of the LIDAR sensor. The LIDAR sensor additionally comprises a reflective surface configured to oscillate about a rotation axis, and a second light source configured to controllably emit light beams onto the reflective surface so that the reflective surface sequentially emits the light beams into sub-regions of the field of view.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
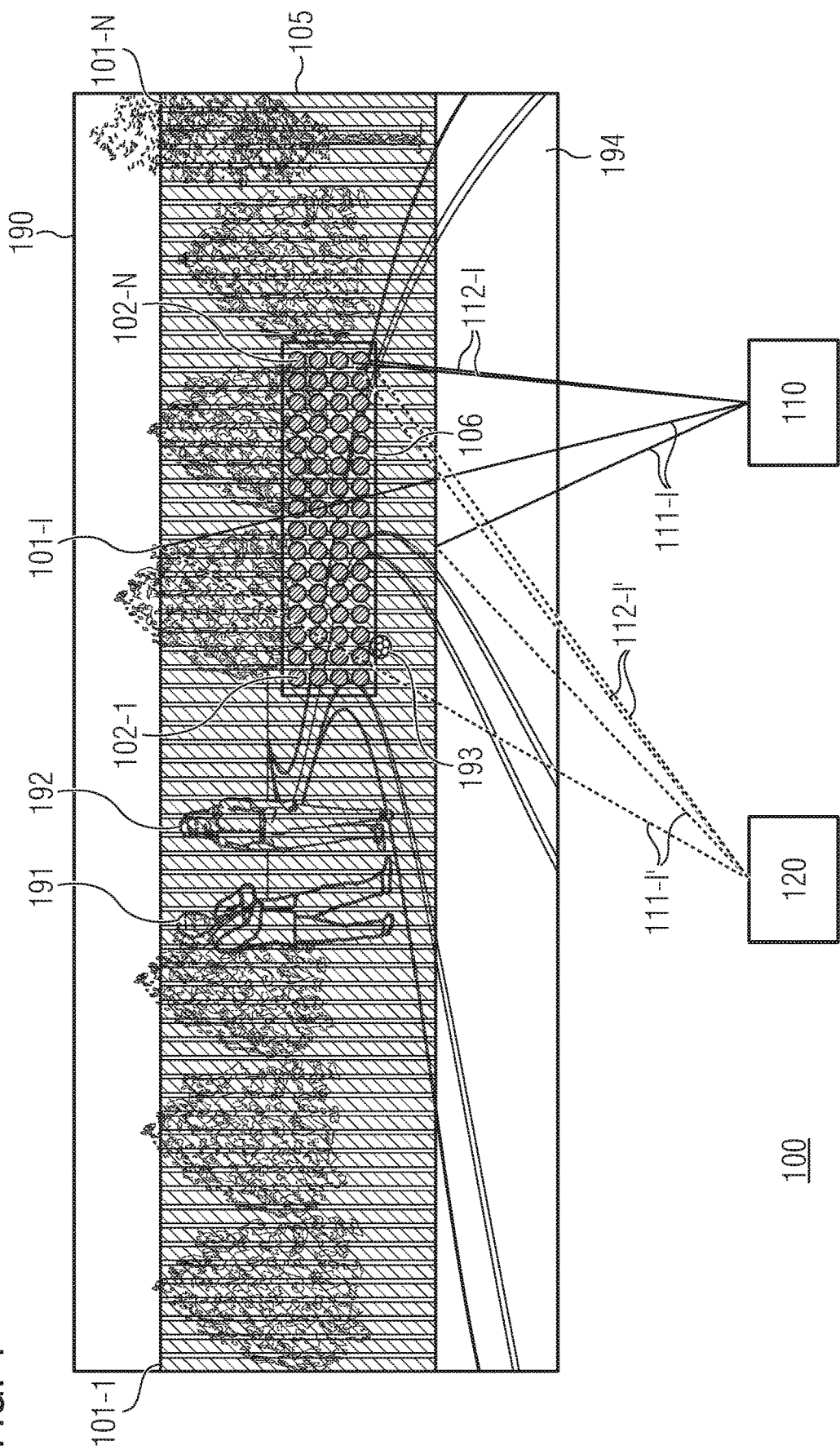
FIG. 1 illustrates a first example of a LIDAR sensor sensing an environment.

FIG. 1 illustrates an example of a LIDAR sensor 100 for sensing an environment 190. The LIDAR sensor 100 comprises an optical transmitter 110 and an optical receiver 120. The LIDAR sensor 100 exhibits a field of view 105 defining the extent of the environment 190 that is observable by the LIDAR sensor 100 at a given time instant.

The LIDAR sensor 100—in particular the optical transmitter 110—may be operated in two different operation modes.

When operated in a first operation mode, the optical transmitter 110 is configured to (exclusively) sequentially illuminate first sub-regions 101-1, . . . , 101-N of the field of view 105 for one-dimensionally scanning the environment 190 in the field of view 105. In FIG. 1, the first sub-regions 101-1, . . . , 101-N are elongated sub-regions of the field of view 105 that extend orthogonal to the horizontal axis (i.e. the first sub-regions 101-1, . . . , 101-N extend substantially in the vertical direction). In other words, the LIDAR sensor 100 is configured to one-dimensionally scan the field of view 105 along the horizontal axis.

For example, the optical transmitter 110 may be configured to selectively emit first (pulsed) light beams into the first sub-regions 101-1, . . . , 101-N of the field of view 105 for one-dimensionally scanning the environment 190 in the field of view 105. An exemplary illumination of the first sub-region 101-I among the plurality of first sub-regions 101-1, . . . , 101-N via a first light beam 111-I is illustrated in FIG. 1.

However, the LIDAR sensor 100 is not limited to one-dimensionally scanning the field of view 105 along the horizontal axis. In general, the LIDAR sensor 100 may be configured to one-dimensionally scan the field of view 105 along any desired (predetermined) axis. For example, the LIDAR sensor 100 may be configured to one-dimensionally scan the field of view 105 along the vertical axis. Accordingly, the first sub-regions may be elongated sub-regions of the field of view 105 that extend orthogonal to the vertical axis (i.e. the first sub-regions may extend substantially in the horizontal direction).

For illuminating the first sub-regions 101-1, . . . , 101-N, the first light beams may have a substantially rectangular cross-section in a plane orthogonal to their respective beam direction (i.e. the first light beam may be line- or strip-shaped).

The optical receiver 120 is configured to receive reflections from the first sub-regions 101-1, . . . , 101-N after their respective illumination by the optical transmitter 110. For example, the optical receiver 120 may comprise a photodetector (not illustrated) configured to receive reflections of the first light beams from the environment 190. The photodetector may, e.g., be a two-dimensional array of light-sensitive sensor elements. In other words, the light-sensitive sensor elements may be arranged along two different (e.g. orthogonal) spatial directions. For example, a light-sensitive sensor element may be a photo diode, an Avalanche Photo Diode (APD), a Single Photon Avalanche Diode (SPAD), or an array of SPADs as Silicon PhotoMultipliers (SiPM).

If an object is located in the environment 190 at a position of the illuminated first sub-region 101-I, the object will reflect the first light beam 111-I back to the LIDAR sensor 100. The reflection 111-I' is received by the photodetector of the optical receiver 120. Based on an illumination time of the first sub-region 101-I and a reception time of the reflection 111-I' from the illuminated first sub-region 101-I, a distance of the LIDAR sensor 100 to the object located in the environment 190 at the position of the illuminated first sub-region 101-I may be determined. In other words, the distance to the object may be determined by a Time-of-Flight (ToF) measurement. For example, a processing circuit (not illustrated) of the LIDAR sensor 100 or an external processing circuit may be coupled to the optical transmitter 110 and the optical receiver 120 for determining the distance to the object.

When operated in a second operation mode, the optical transmitter 110 is configured to sequentially illuminate second sub-regions 102-1, . . . 102-N of the field of view 105 for scanning the environment 190 in a portion 106 of the field of view 105. The portion 106 of the field of view 105 is smaller than the full field of view 105 and, hence, covers only a part of the full field of view 105. For illuminating the second sub-regions 102-1, . . . 102-N, the optical transmitter 110 uses a second illumination intensity that is higher than a first illumination intensity used by the optical transmitter 110 for illuminating the first sub-regions 101-1, . . . , 101-N. In other words, the optical transmitter 110 uses a higher light power per unit area for illuminating the second sub-regions 102-1, . . . 102-N than for illuminating the first sub-regions 101-1, . . . , 101-N. In some examples, the optical transmitter 110 may alternatively use the same illumination intensity but a different wavelength or a different (e.g. lower) beam divergence for illuminating the second sub-regions 102-1, . . . 102-N than for illuminating the first sub-regions 101-1, . . . , 101-N. As indicated in FIG. 1, the second sub-regions 102-1, . . . 102-N cover smaller portions of the field of view 150 than the first sub-regions 101-1, . . . , 101-N.

For example, the optical transmitter 110 may be configured to selectively emit second (pulsed) light beams into the second sub-regions 102-1, . . . 102-N of the field of view 105 for scanning the portion 106 of the field of view 105. Since the optical transmitter 110 uses the second illumination intensity for illuminating the second sub-regions 102-1, . . . 102-N that is higher than the first illumination intensity used by the optical transmitter 110 for illuminating the first sub-regions 101-1, . . . , 101-N, a light intensity of the second light beams is higher than a light intensity of the first light beams. An exemplary illumination of the second sub-region 102-I among the plurality of second sub-regions 102-1, . . . , 102-N via a second light beam 112-I is illustrated in FIG. 1. Alternatively, the second light beams may exhibit a different wavelength or a different beam divergence than the first light beams.

In FIG. 1, the second sub-regions 102-1, . . . , 102-N exhibit a circular cross section. Accordingly, the second light beams may have a substantially circular cross-section in a plane orthogonal to their respective beam direction. However, the optical transmitter 110 is not limited to using circular second sub-regions 102-1, . . . , 102-N. In general, the sub-regions 102-1, . . . , 102-N (and, hence, also the second light beams) may exhibit any shape/cross section (e.g. angular, quadratic, elongated, strip-shaped etc.). However, the cross-sections of the second light beams in a plane orthogonal to their respective beam direction are smaller than the cross-sections of the first light beams in a plane orthogonal to their respective beam direction. In some examples, a cross-section of one of the second light beams in a plane orthogonal to its beam direction may, e.g., be rotated with respect to a cross-section of one of the first light beams in a plane orthogonal to its beam direction (e.g. the first and second light beams may exhibit elongated shapes along orthogonal spatial axes).

The first and second light beams may, e.g., exhibit different polarizations and/or different wavelengths. For example, the first and second light beams may be infrared light beams. The first and second light beams may, e.g., be laser beams.

The optical receiver 120 is further configured to receive reflections from the second sub-regions 102-1, . . . 102-N after their respective illumination by the optical transmitter 110. For example, the photodetector of the optical receiver 120 may be configured to receive reflections of the second light beams from the environment 190. If an object is located in the environment 190 at a position of the illuminated second sub-region 102-I, the object will reflect the second light beam 112-I back to the LIDAR sensor 100. The reflection 112-I' is received by the photodetector of the optical receiver 120. Similarly to what is described above for the first sub-region 101-I, a distance to the object located in the environment 190 at the position of the illuminated second sub-region 102-I may be determined based on an illumination time of the second sub-region 102-I and a reception time of the reflection 112-I' from the illuminated second sub-region 102-I.

In FIG. 1, the second sub-regions 102-1, . . . 102-N are arranged two-dimensionally. Therefore, when operated in the second operation mode, the optical transmitter 110 may be configured to illuminate the second sub-regions 102-1, . . . 102-N such that the 190 environment in the portion 106 of the field of view 105 is scanned two-dimensionally. In other words, the LIDAR sensor 100 may two-dimensionally scan the environment 190 in the portion 106 of the field of view 105. However, the LIDAR sensor 100 is not limited to two-dimensionally scanning the environment 190 in the second operation mode. In some examples, the second sub-regions 102-1, . . . 102-N may be arranged one-dimensionally so that the LIDAR sensor 100 may be configured to one-dimensionally scan the environment 190 in the portion 106 of the field of view 105 when operated in the second operation mode.

The LIDAR sensor 100 may allow to sense the environment using different sensing conditions. The one-dimensional scan of the field of view 105 using the first sub-regions 101-1, . . . , 101-N may allow to detect large or tall objects at mid or short distances to the LIDAR sensor 100 such as the two people 191 and 192 at the roadside in the environment 190. The (e.g. two-dimensional) scan of the portion 106 of the field of view 105 using the smaller second sub-regions 102-1, . . . , 102-N and the higher illumination intensity may allow to detect small objects at long distances to the LIDAR sensor 100 such as the ball 193 in the environment 190. Therefore, the LIDAR sensor 100 may provide an increased flexibility and an increased operability compared to conventional LIDAR systems.

When operated in the second operation mode, the optical transmitter 110 may, e.g., be configured to simultaneously illuminate the second sub-regions 102-1, . . . , 102-N and the first sub-regions 101-1, . . . , 101-N. That is, the optical transmitter 110 may be configured to illuminate the second sub-regions 102-1, . . . , 102-N in combination with the first sub-regions 101-1, . . . , 101-N. In other words, the optical transmitter 110 may be configured to superimpose the sequential illumination of the first sub-regions 101-1, . . . , 101-N and the illumination of the second sub-regions 102-1, . . . , 102-N. Accordingly, the photodetector of the optical receiver 120 may simultaneously (in parallel) receive reflections from the first and second sub-regions in the second operation mode. This configuration of the second operation mode may enable a one-dimensional scan of the field of view 105 at a high frame rate and at the same time a scan of the portion 106 of the field of view with increased range and increased resolution.

Alternatively, when operated in the second operation mode, the optical transmitter 110 may be configured to exclusively illuminate the second sub-regions 102-1, . . . , 102-N of the field of view 105. In other words, the optical transmitter 110 may be configured to only illuminate the second sub-regions 102-1, . . . , 102-N but not the first sub-regions 101-1, . . . , 101-N in the second operation mode. Accordingly, the photodetector of the optical receiver 120 may exclusively receive reflections from the second sub-regions in the second operation mode. In this configuration of the second operation mode, the LIDAR sensor 100 may enable to switch from one-dimensionally scanning of the full field of view 105 to (e.g. two-dimensionally) scanning of only the portion 106 of the field of view 105. The LIDAR sensor 100 may, hence, switch between a one-dimensional scan of the field of view 105 at a high frame rate and a scan of the portion 106 of the field of view 150 with increased range and increased resolution.

For example, the optical transmitter 110 may be configured to switch operation from the first operation mode to the second operation mode upon reception of control data indicating a region of interest in the environment 190. The LIDAR sensor 100 may be configured to adjust the portion 106 of the field of view 105 accordingly so the portion 106 of the field of view 105 (substantially) corresponds to the region of interest. For example, if the LIDAR sensor 100 is used in a vehicle (e.g. an automobile, a truck or a motorcycle), the region of interest may be a road 194 as illustrated in FIG. 1. As illustrated in FIG. 1, the portion 106 of the field of view 105 substantially covers the road 194. Accordingly, small objects on the road surface (such as the ball 193, kids or debris) may be detected already at long distances in the second operation mode. The control data may, e.g., be determined based on the one-dimensional scan of the environment in the first operation mode. For example, a processing circuit (not illustrated) of the LIDAR sensor 100 or an external processing circuit (not illustrated) may generate the control data. Alternatively, or additionally, the control data may, e.g., be determined based on measurement data of one or more other sensors (e.g. a radar sensor, a video camera, etc.).

Figure 2:
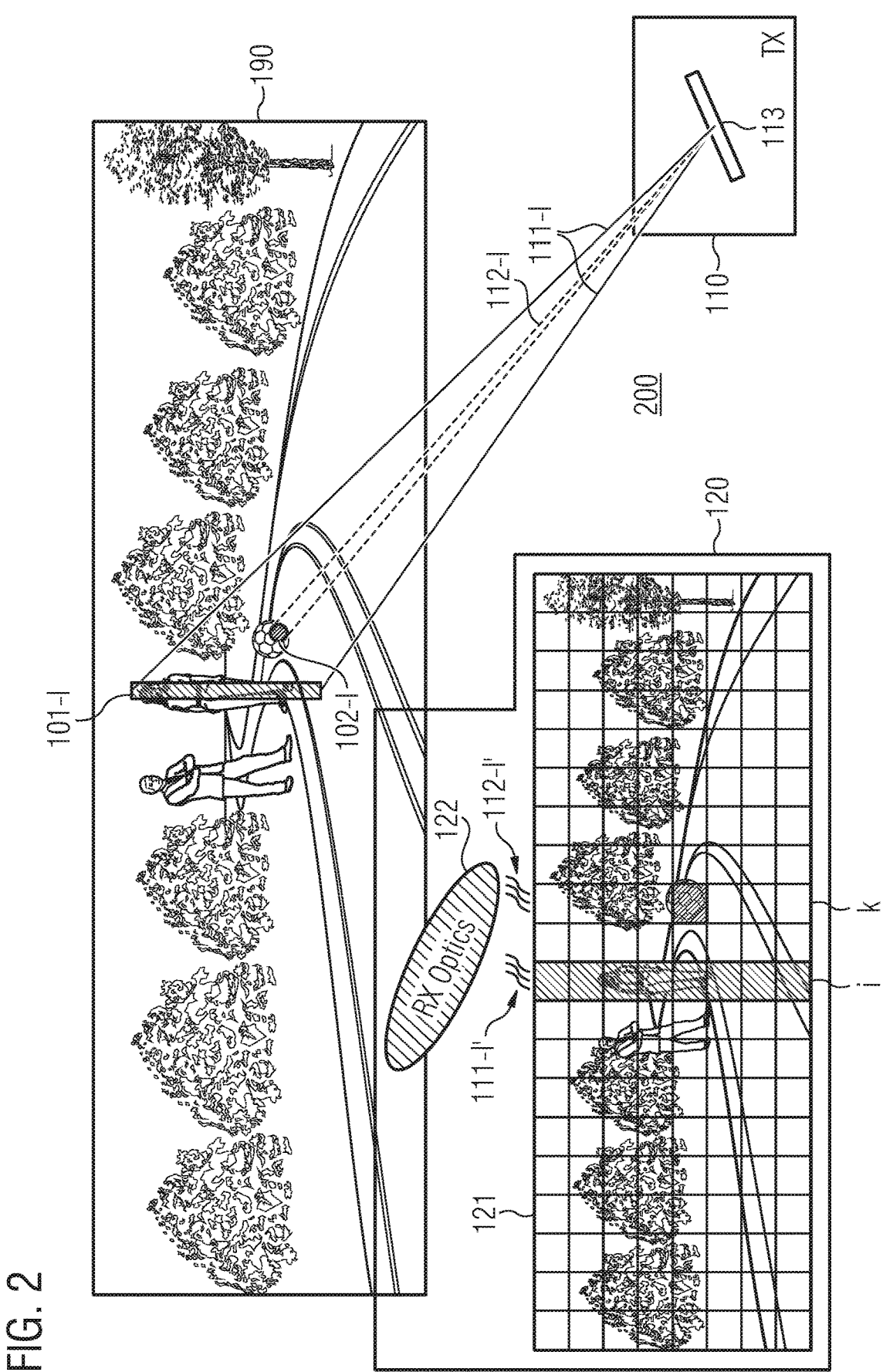
FIG. 2 illustrates a second example of a LIDAR sensor sensing an environment.

FIG. 2 illustrates a more detailed example of a LIDAR sensor 200 for sensing the environment 190. Compared to LIDAR sensor 100 illustrated in FIG. 1, LIDAR sensor 200 shows more details of the optical transmitter 110 and the optical receiver 120. Therefore, it is mainly referred to the differences of LIDAR sensor 200 in comparison to LIDAR sensor 100. For reasons of simplicity only one first sub-region 101-I and only one second sub-region 102-I are illustrated in FIG. 2.

The optical transmitter 110 of LIDAR sensor 200 comprises at least one reflective surface 113 for emitting the first and second light beams 101-I and 102-I into the first and second sub-regions 101-I and 102-I. The reflective surface 113 is configured to oscillate about a rotation axis. That is, the reflective surface 113 rotates about the rotation axis along a first rotation direction from a first end position to a second end position, and vice versa, i.e. along a reverse second rotation direction from the second end position to the first end position. For example, the oscillation movement of the reflective surface 113 may comprise rotations along both rotation directions between 2° and 45°. An oscillation frequency of the reflective surface 113 about the rotation axis may be adjustable (e.g. by a control circuit of the LIDAR sensor 200). For example, the reflective surface 113 may oscillate about the rotation axis at frequencies between 10 Hz and 100 kHz (e.g. at 2.5 kHz). The reflective surface 113 may be implemented in many different ways. In some examples, the reflective surface 113 may be a MEMS (MicroElectroMechanical System) mirror.

The optical receiver 120 of LIDAR sensor 200 comprises a photodetector 121 implemented as a two-dimensional (or one-dimensional) array of light-sensitive sensor elements. Further, the optical receiver 120 comprises an optical system 122 (e.g. comprising one or more lenses) configured to project the reflections 111-I' and 112-I' onto the photodetector 121.

Due to the elongated shape along the vertical axis of the first light beam 111-I for illuminating the first sub-region 101-I also the reflection 111-I' from the first sub-region 101-I exhibits an elongated shape along the vertical axis. Therefore, the reflection 111-I' hits an entire column i of light-sensitive sensor elements at the photodetector 121. The second light beam 112-I for illuminating the second sub-region 102-I exhibits a smaller cross section in the plane orthogonal to its beam direction so that the reflection 112-I' from the second sub-region 102-I hits only a small number of light-sensitive sensor elements at the photodetector 121 (e.g. a single light-sensitive sensor element). For example, the reflection 112-I' may hit only one of the light-sensitive sensor elements in column k as illustrated in FIG. 2.

Each light-sensitive sensor element of the photodetector 121 is only capable of receiving light from a certain solid angle. To illustrate this, the representation of the light-sensitive sensor elements of the photodetector 121 is underlaid in FIG. 2 with a representation of the environment 190. As can be seen from FIG. 2, each light-sensitive sensor element of the photodetector 121 is only capable of receiving light from a certain portion of the environment 190.

Since the solid angles into which the first and second light beams 111-I and 112-I are emitted are known, it is sufficient to only observe these solid angles via the photodetector 121. That is, only those light-sensitive sensor elements of the photodetector 121 may be selectively activated or enabled that are capable of receiving light from the solid angles into which the first and second light beams 111-I and 112-I are emitted. The other light-sensitive sensor elements of the photodetector 121 may be selectively deactivated, disabled or disconnected. Accordingly, a power efficient operation of the photodetector 121 may be enabled. For example, only the light-sensitive sensor elements in column i (and optionally the light-sensitive sensor elements in one or more neighboring columns) may be activated if the first light beam 111-I is emitted, since only these light-sensitive sensor elements may receive reflections from the first sub-region 101-I. Similarly, only the light-sensitive sensor elements in column k (and optionally the light-sensitive sensor elements in one or more neighboring columns) may be activated if the second light beam 112-I is emitted, since only these light-sensitive sensor elements may receive reflections from the second sub-region 102-I. The selective activation and deactivation of individual light-sensitive sensor elements of the photodetector 121 may, e.g., be controlled by a control circuit (not illustrated) of the LIDAR sensor 200.

The (high resolution) two-dimensional photodetector 121 of LIDAR sensor 200 may support one-dimensional scanning in the first operation mode as well as two-dimensional scanning in the second operation mode.

Figure 3:
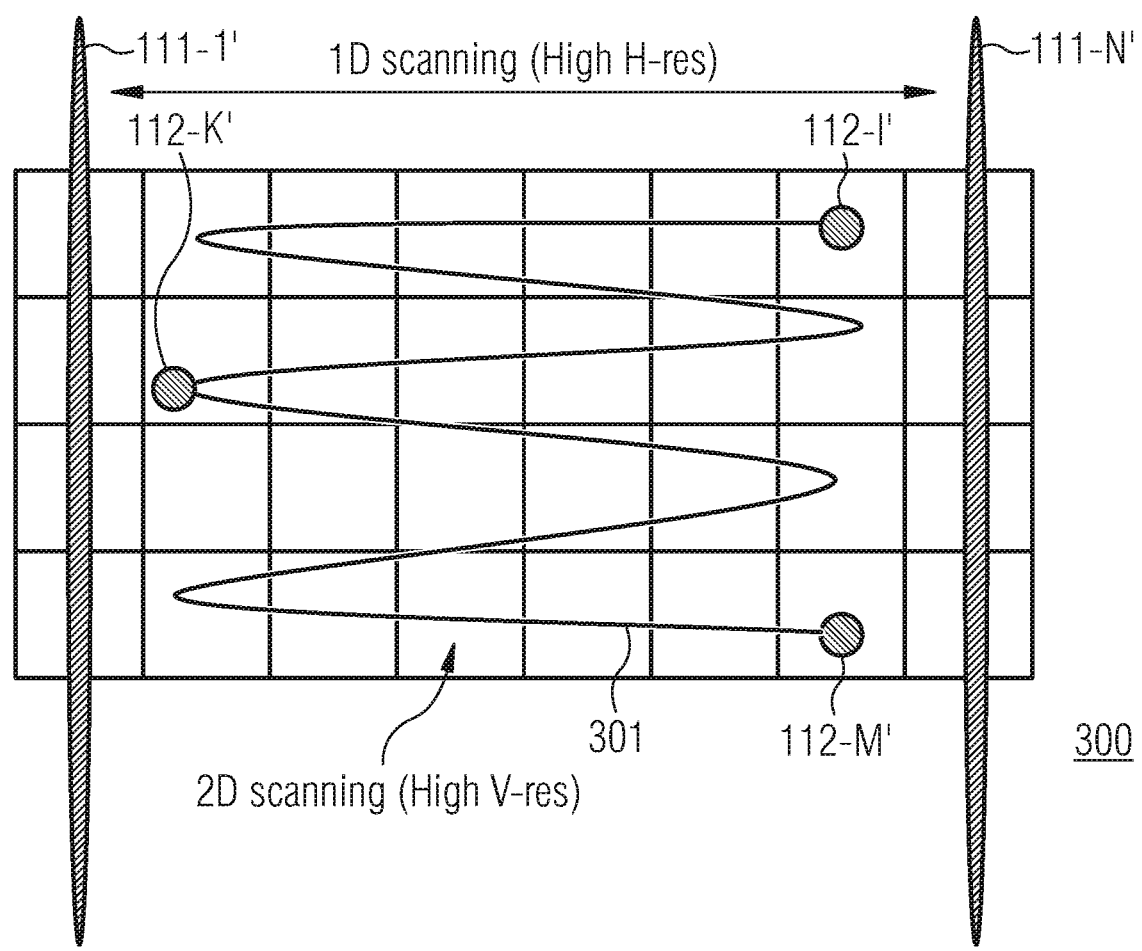
FIG. 3 illustrates an example of a photodetector for a LIDAR sensor.

FIG. 3 illustrates a surface of an exemplary photodetector 300 for a LIDAR sensor according to the proposed technique. The photodetector 300 is implemented as a two-dimensional array of light-sensitive sensor elements.

Further illustrated are two reflections 111-1' and 111-N' of first light beams for one-dimensionally scanning the environment in the field of view (e.g. as in the first operation mode described above). The two illustrated reflections 111-1' and 111-N' are reflections of the first and the last beam of a sequence of the first light beams. As indicated in FIG. 3, the reflections of the first light beams hit the photodetector 300 at varying positions along the horizontal axis as the sequence passes through. In other words, the reflections of the first light beams hit varying columns of the light-sensitive sensor elements as the sequence passes through. The one-dimensional scanning of the environment along the horizontal axis may allow a high horizontal resolution at a high framerate.

Additionally, three reflections 112-I', 112-K' and 112-M' of second light beams for two-dimensionally scanning the environment in a portion of the field of view (e.g. as in the second operation mode described above) are illustrated. The two-dimensional scan is indicated in FIG. 3 by line 301 superimposing a movement along the horizontal axis and a movement along the vertical axis. Due to the smaller cross sections of the second light beams compared to the first light beams, the reflections of the second light beams hit only individual light-sensitive sensor elements of the photodetector 300. Compared to the one-dimensional scan, the two-dimensional scan may provide a high vertical resolution. Since the light intensity of the second light beams is higher than for the first light beams, the two-dimensional scan may enable an increased range for object detection in the environment.

A LIDAR sensor according to the proposed technique may therefore enable high vertical and horizontal resolution, i.e. high resolution in two orthogonal directions. As said before, two-dimensional scanning is optional. A LIDAR sensor according to proposed technique may operate in one-dimensional scanning mode(s) only.

Figure 4:
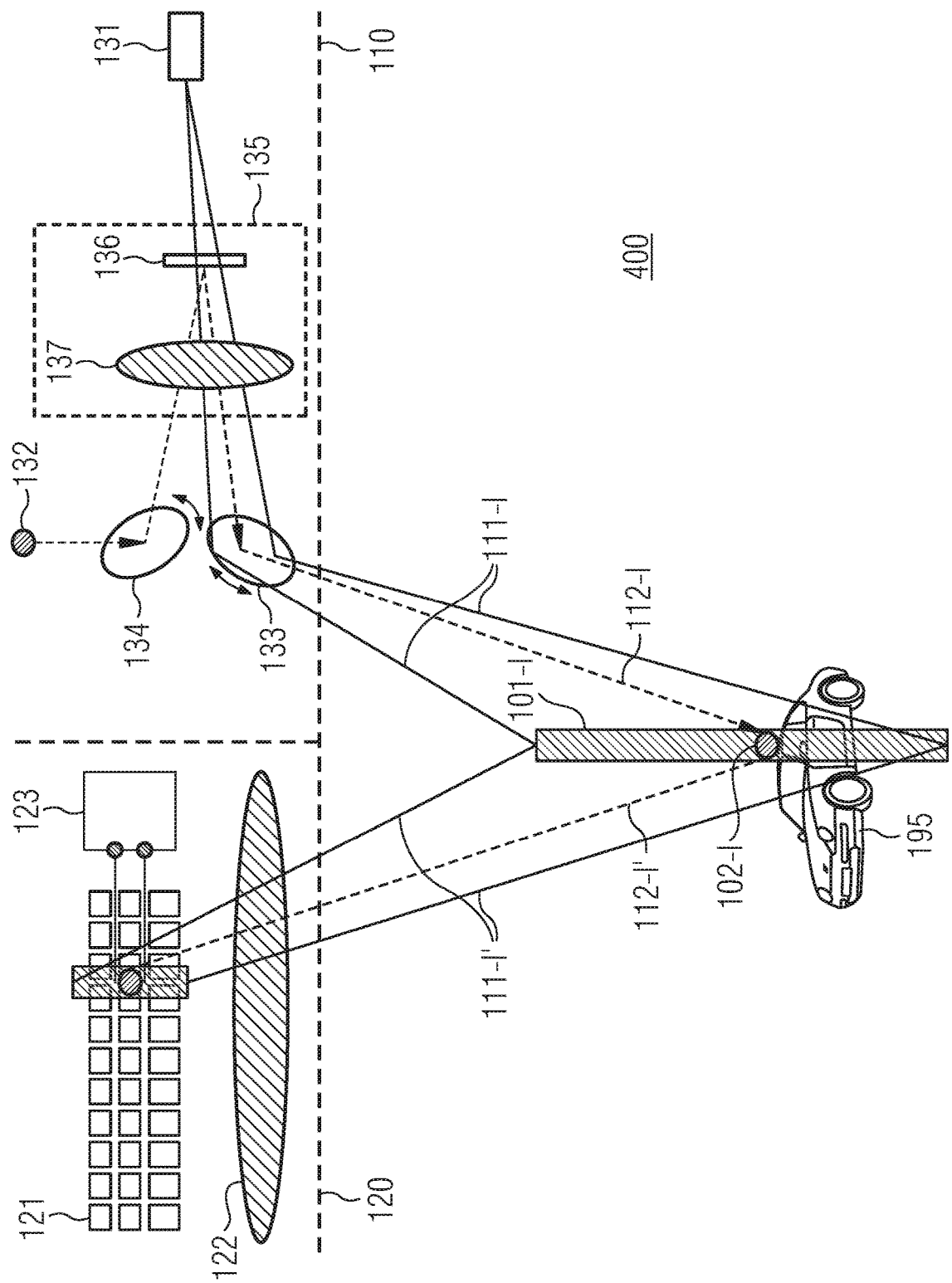
FIG. 4 illustrates a third example of a LIDAR sensor sensing an environment.

FIG. 4 illustrates another example of a LIDAR sensor 400 showing more structural details than the LIDAR sensors described above. Again, the LIDAR sensor 400 comprises an optical transmitter 110 and an optical receiver 120.

The optical transmitter 110 comprises two light sources 131 and 132 for generating the first and second light beams. For example, the two light sources 131 and 132 may be laser diodes (e.g. edge emitting laser diodes). The first and second light beams may, e.g., exhibit different polarizations and/or different wavelengths. Further, the optical transmitter 110 comprises a first reflective surface 133 (e.g. a MEMS mirror) configured to oscillate about a first rotation axis. Alternatively, a rotating or spinning reflective surface may be used instead of the oscillating reflective surface (including a quasi-static movement of the reflective surface).

The first light source 131 is configured to controllably emit the first light beams via an optical system 135 onto the first reflective surface 133 so that the first reflective surface 133 emits the first light beams into the first sub-regions of the field of view. This is exemplarily illustrated in FIG. 4 for a first light beam 111-I. The first light beam 111-I is emitted via the system 135 onto the first reflective surface 133 so that the first reflective surface 133 emits (deflects) the first light beam 111-I into first sub-region 101-I of the LIDAR sensor's field of view. In some examples, the optical system 135 may be omitted so that the first light source 131 directly emits the first light beams onto the first reflective surface 133.

The optical transmitter 110 additionally comprises a second reflective surface 134 (e.g. a MEMS mirror) configured to oscillate about a second rotation axis (that is different from the first rotation axis). The first and second rotation axes are arranged at an angle with respect to each other, wherein the angle is different from 0° and 180°. For example, the first rotation axis may orthogonal to the second rotation axis. In other words, the reflective surfaces 133 and 134 may oscillate about orthogonal rotation axes.

The second light source 132 is configured to controllably emit the second light beams onto the second reflective surface 134 so that the second reflective surface 134 emits (deflects) the second light beams via the optical system 135 onto the first reflective surface 133. The first reflective surface 133 is configured to emit (deflect) the second light beams into the second sub-regions of the field of view. This is exemplarily illustrated in FIG. 4 for a second light beam 112-I. The second light beam 112-I is emitted onto the second reflective surface 134 so that the second reflective surface 134 emits the second light beam 112-I via the optical system 135 onto the first reflective surface 133, which in turn emits the second light beam 112-I into second sub-region 102-I of the LIDAR sensor's field of view.

Since the reflective surfaces 133 and 134 oscillate about differently aligned (e.g. orthogonal) rotation axes, the second light beams may be emitted to the environment in a two-dimensional pattern. In particular, the reflective surfaces 133 and 134 may allow to adjust beam directions of the second light beams along two different spatial axes (e.g. two orthogonal spatial axes). In other words, the second light beams may enable two-dimensional scanning of the environment.

For example, a control circuit of the LIDAR sensor 400 (not illustrated) may be configured to control emission times of the first and second light sources 131 and 132 such that the first and second reflective surfaces 133 and 134 emit the first and second light beams to the environment as described above.

The optical system 135 comprises an optical element 136 configured to receive the second light beams from the second reflective 134, and to reflect the second light beams onto the first reflective surface 133. Further, the optical element 136 is optically transparent for the first light beams so that the first light beams emitted by the first light source 131 transmit through the optical element 136 to the first reflective surface 133. For example, if the first and second light beams exhibit different polarizations, the optical element 136 may be a polarizing beam splitter (e.g. a mirror). Alternatively, if the first and second light beams exhibit different wavelengths, the optical element 136 may be wavelength sensitive with regard to its reflectivity and transmission properties.

The optical system 135 additionally comprises an optical lens system 137 arranged between the optical element 136 and both of the first and second reflective surfaces 133 and 134. In alternative examples, the optical lens system 137 may be arranged between the optical element 136 and only one of the first and second reflective surfaces 133 and 134. The optical lens system 137 serves as relay optics enabling small distances between the two reflective surfaces 133 and 134. For example, a distance between the first and second reflective surfaces 133 and 134 may be (substantially) equal to a diameter or a longitudinal extension of one of the first and second reflective surfaces 133 and 134. In some examples, the distance between the first and second reflective surfaces 133 and 134 may be smaller than the diameter or the longitudinal extension of one of the first and second reflective surfaces 133 and 134. Due to the small distances between the two reflective surfaces 133 and 134, the reflective surfaces 133 and 134 (e.g. implemented as MEMS mirrors) may be arranged in the same semiconductor package. Alternatively, the reflective surfaces 133 and 134 (e.g. implemented as MEMS mirrors) may be arranged in two separate semiconductor packages.

In the example of FIG. 4, an object 195 is present in the environment at the locations of the first sub-region 101-I and the second sub-region 102-I. The first and second light beams 111-I and 112-I are therefore reflected back to the LIDAR sensor 400. The reflections 111-I' and 112-I' are sensed by the optical receiver 120 of the LIDAR sensor. In particular, an optical system 122 of the optical receiver 120 (e.g. comprising one or more lenses) is configured to project the reflections 111-I' and 112-I' onto the photodetector 121. The photodetector 121 is again implemented as a two-dimensional array of light-sensitive sensor elements.

The individual light-sensitive sensor elements may be read out by a read-out circuit 123. The reception times of the individual reflections from the illuminated sub-regions of the field of view may be determined based on the read-out signals provided by the read-out circuit 123. Together with the emission times of the first and second light sources 131 and 132 for the related first and second light beams, a distance of the LIDAR sensor 400 to the object 195 may be determined.

The LIDAR sensor 400 may allow one-dimensional scanning and optionally two-dimensional scanning of the environment in accordance with the proposed LIDAR technique. The LIDAR sensor 400 may further enable to increase the illumination intensity in a portion of the LIDAR sensor's field of view without adjusting the relay optics (the optical system 135) in terms of, e.g., divergence, focus, etc. The setting of the relay optics (the optical system 135) is the same (unchanged) for both operation modes.

Figure 5:
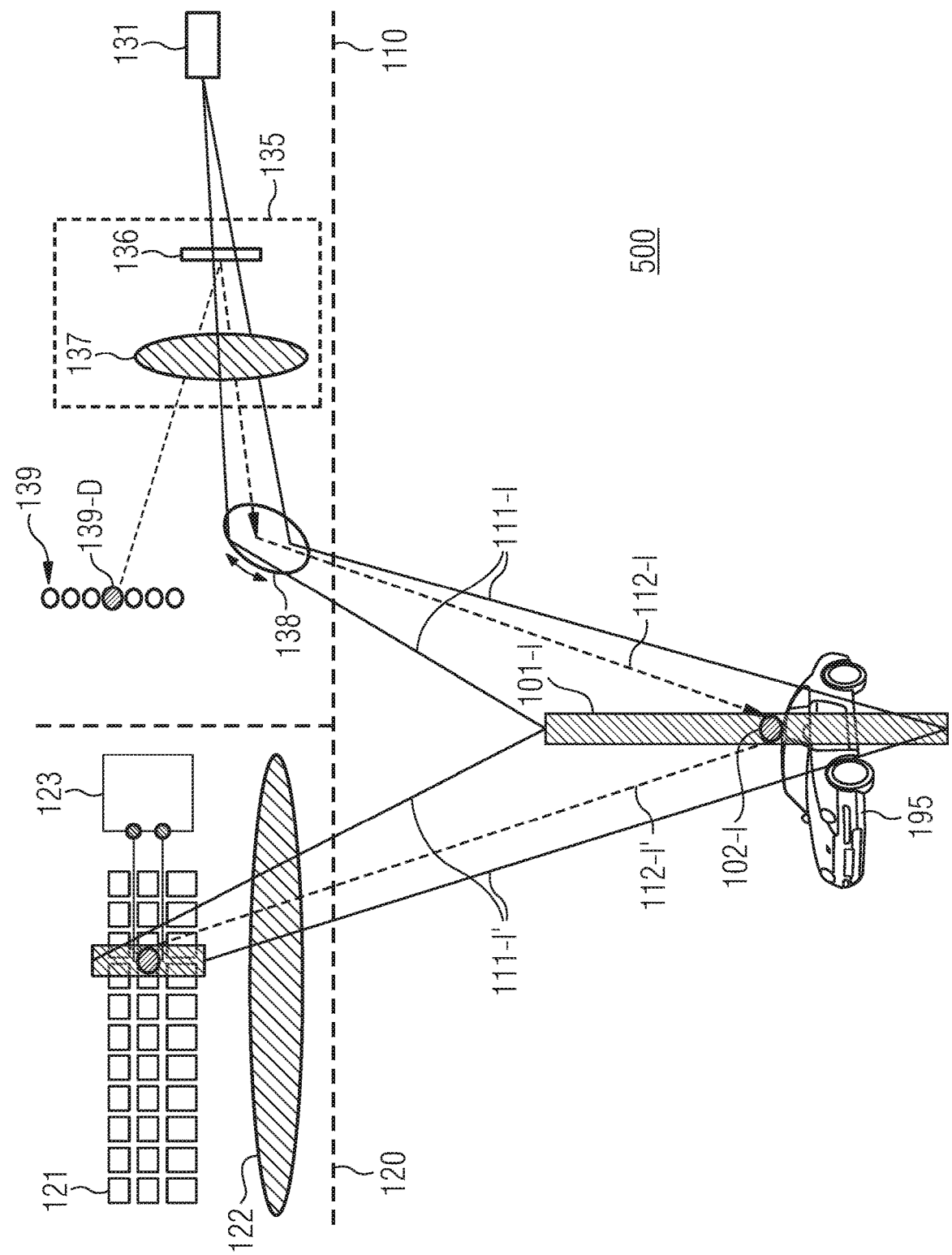
FIG. 5 illustrates a fourth example of a LIDAR sensor sensing an environment.

A LIDAR sensor 500 using an alternative structure for the optical transmitter 110 is illustrated in FIG. 5. Compared to LIDAR sensor 400 illustrated in FIG. 4, LIDAR sensor 500 uses only a different structure for the optical transmitter 110. Therefore, it is mainly referred to the differences of LIDAR sensor 500 in comparison to LIDAR sensor 400.

Instead of using two reflective surfaces, the LIDAR sensor 500 uses only one reflective surface 138 together a linear array of second light sources 139 for generating the second light beams. The reflective surface 138 is configured to oscillate about a rotation axis. The linear array of second light sources 139 is arranged along a spatial axis which in turn is arranged at an angle different from 0° and 180° with respect to the rotation axis. For example, the linear array of second light sources 139 may be arranged along a spatial axis orthogonal to the rotation axis.

As in LIDAR sensor 400, a first light source 131 is configured to controllably emit the first light beams via an optical system 135 onto the reflective surface 138 so that the reflective surface 138 emits the first light beams into the first sub-regions of the field of view. This is again illustrated for the first light beam 111-I.

Each second light source of the linear array of second light sources 139 is configured to controllably emit a respective second light beam via the optical system 135 onto the reflective surface 138 so that that the reflective surface 138 emits the second light beams into the second sub-regions of the field of view. This is exemplarily illustrated in FIG. 5 for a second light beam 112-I. The second light source 139-D is selectively activated (e.g. by a control circuit of the LIDAR sensor 500) so that the second light beam 112-I is emitted by the second light source 139-D via the optical system 135 onto the reflective surface 138. The reflective surface 138 in turn emits the second light beam 112-I into second sub-region 102-I of the LIDAR sensor's field of view.

Instead of using a second mirror for varying the position to which the second light beams are projected onto the reflective surface 138, the LIDAR sensor 500 selectively activates different ones of the linear array of second light sources 139 to vary the projection position of the second light beams on the reflective surface 138. One or more of the second light sources of the linear array of second light sources 139 may be selectively activated at a time.

For example, a control circuit of the LIDAR sensor 500 (not illustrated) may be configured to control emission times of the first light sources and the individual second light sources of the linear array of second light sources 139 such that the first reflective surface 138 emits the first and second light beams to the environment as described above.

The optical system 135 is substantially identical to what is described above. The optical system 135 comprises an optical element 136 configured to receive the second light beams from the linear array of second light sources 139, and to reflect the second light beams onto the reflective surface 138. Again, the optical element 136 is optically transparent for the first light beams so that the first light beams emitted by the first light source 131 transmit through the optical element 136 to the reflective surface 138.

Further, the optical system 135 comprises an optical lens system 137 arranged between the optical element 136 and both of the reflective surface 138 and the linear array of second light sources 139. In alternative examples, the optical lens system 137 may be arranged between the optical element 136 and only one of the reflective surface 138 and the linear array of second light sources 139. The optical lens system 137 serves as relay optics.

Also the LIDAR sensor 500 may allow one-dimensional scanning and optionally two-dimensional scanning of the environment in accordance with the proposed LIDAR technique. Also LIDAR sensor 500 may enable to increase the illumination intensity in a portion of the LIDAR sensor's field of view without adjusting the relay optics (the optical system 135) in terms of, e.g., divergence, focus, etc. The setting of the relay optics (the optical system 135) is the same (unchanged) for both operation modes.

Figure 6:
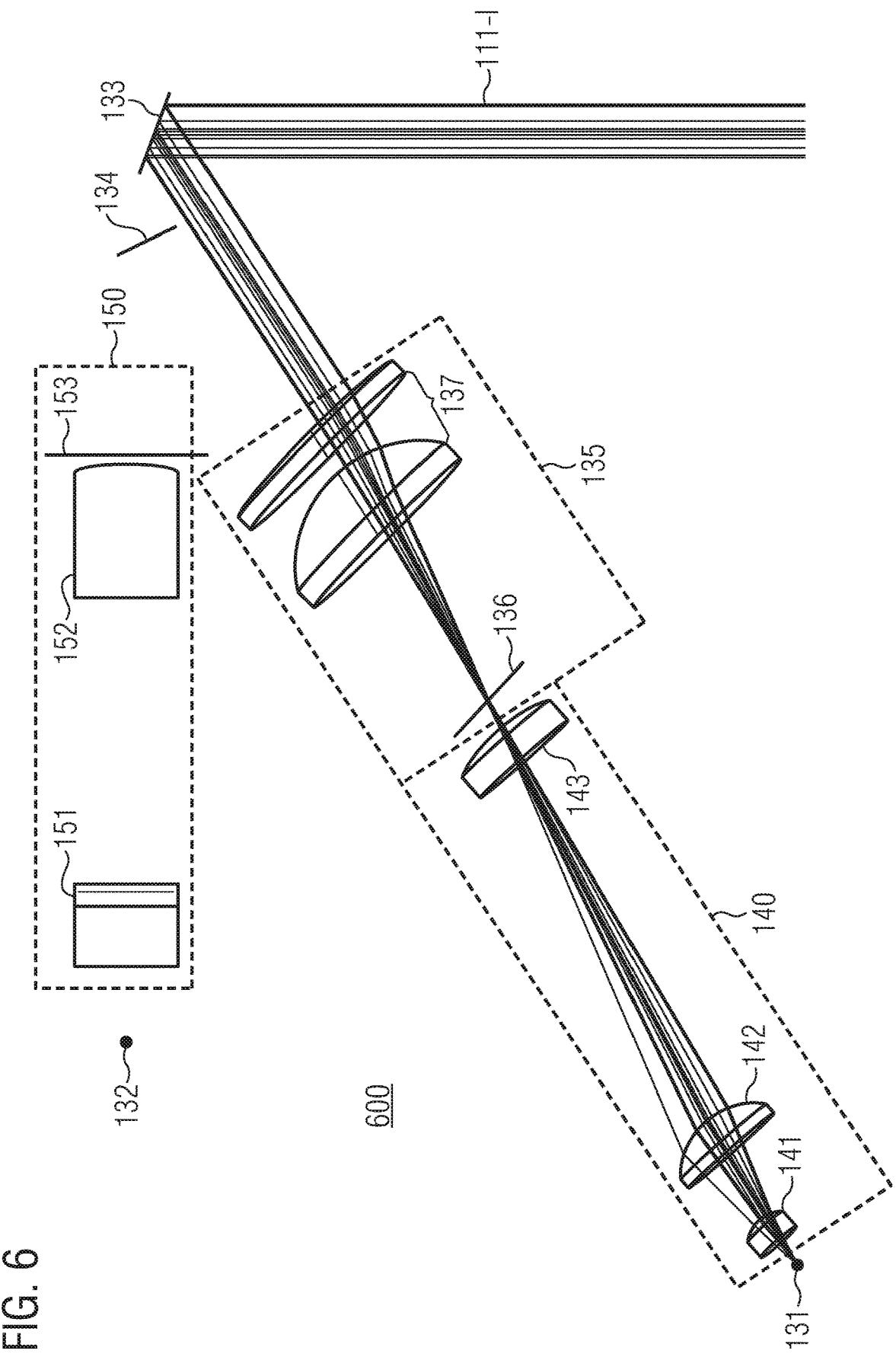
FIG. 6 illustrates a fifth example of a LIDAR sensor.
Figure 7:
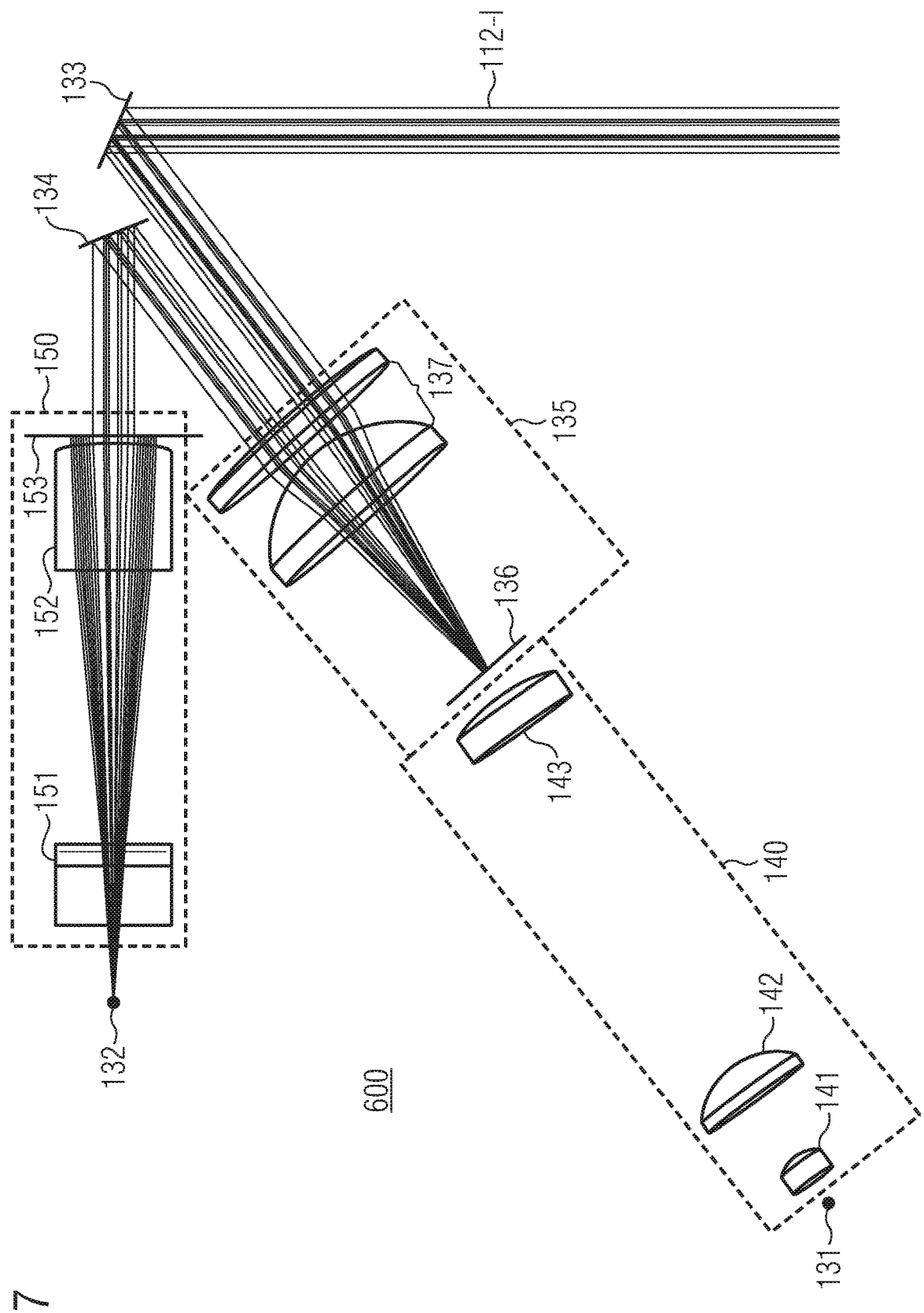
FIG. 7 illustrates the fifth example of the LIDAR sensor in another operation mode.
Figure 8:
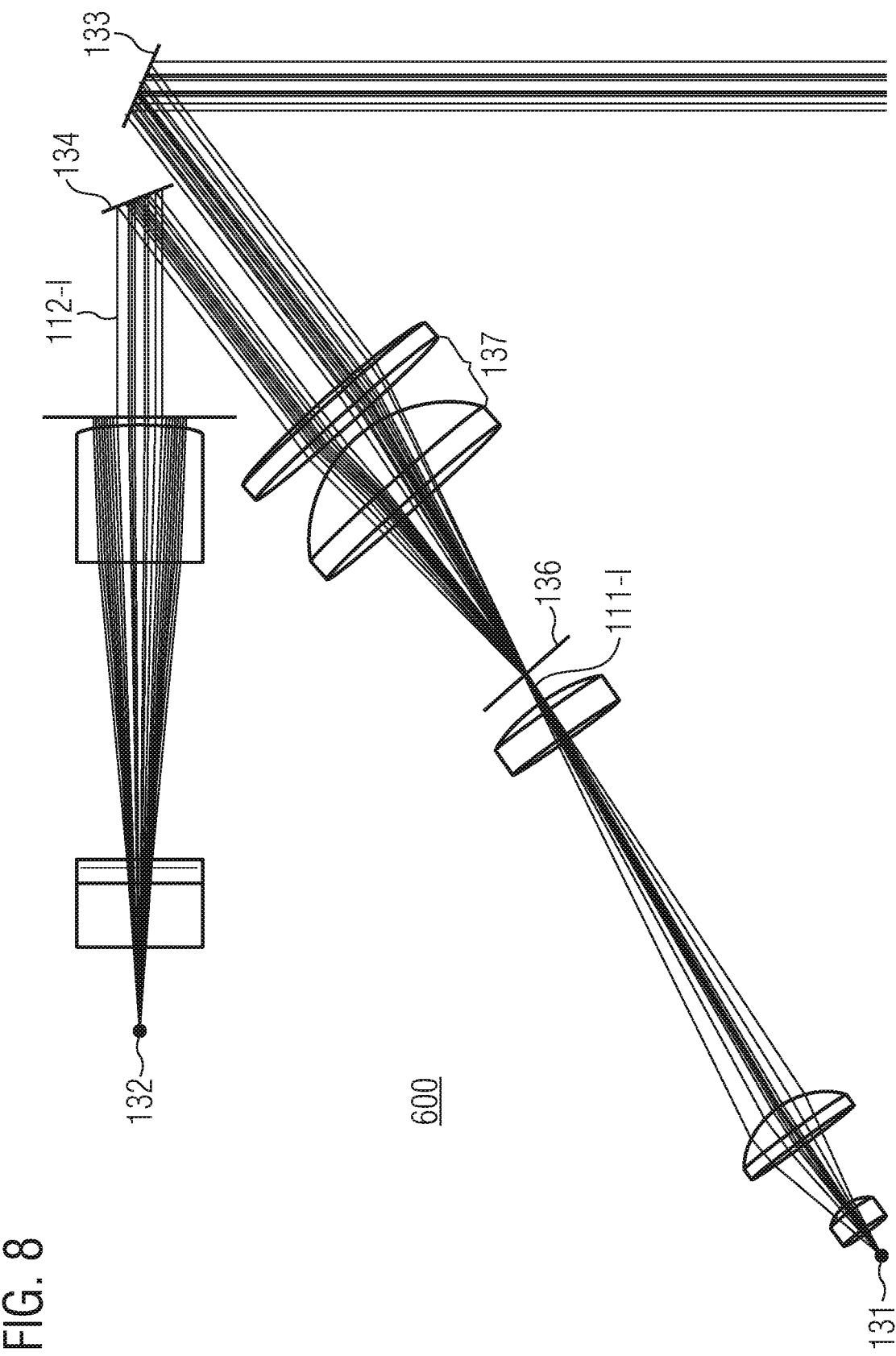
FIG. 8 illustrates the fifth example of the LIDAR sensor in still another operation mode.

Another example of a LIDAR sensor 600 showing more structural details of the optical transmitter will be described in the following in connection with FIGS. 6 to 8. In FIGS. 6 to 8 only the optical transmitter of the LIDAR sensor 600 is illustrated. FIG. 6 illustrates the LIDAR sensor 600 when operated in the first operation mode, i.e. the LIDAR sensor 600 is performing only a one-dimensional scan.

The first light source (e.g. an edge emitting laser diode) 131 is configured to emit first light beams. This is exemplarily illustrated in FIG. 6 for a first light beam 111-I. The second light source 132 and the second reflective surface 134 are not active (disabled).

A first optical projection system 140 is used for projecting the first light beams onto the optical element 136 of the optical system 135. The optical system 135 is arranged between the first reflective surface 133 and the first light source 131. As illustrated in FIG. 6, the first optical projection system 140 may, e.g., comprise three optical lenses for adjusting the shape (e.g. the cross section) of the first light beams and focusing them onto the optical element 136. As described above, the first light beams transmit through the optical element 136 and pass the optical lens system 137. The optical lens system 137 collimates the first light beams and projects them onto the first reflective surface 133 so that they are emitted to the first sub-regions of the field of view.

Further illustrated in FIG. 6 is a second optical system 150 used for collimating and projecting the second light beams of the second light source 132 onto the second reflective surface. This is further illustrated in FIG. 7 showing the LIDAR sensor 600 when operated in a second operation mode in which the LIDAR sensor 600 is performing only a two-dimensional scan.

Therefore, the second light source (e.g. an edge emitting laser diode) 132 is configured to emit the second light beams. This is exemplarily illustrated in FIG. 7 for a second light beam 112-I. The first light source 131 is not active.

The second optical system 150 is used for collimating and adjusting the shape (e.g. the cross section) of the second light beams. Further, the second optical system 150 is used for projecting (focusing) the second light beams onto the second reflective surface 134. As illustrated in FIG. 7, the second optical projection system 150 may, e.g., comprise two optical lenses 151 and 152 for collimating the second light beams and an aperture for adjusting the shape of the collimated second light beams.

The second reflective surface 134 deflects the second light beams via the optical lens system 137 onto the optical element 136 of the optical system 135. The optical element 136 reflects the second light beams via the optical lens system 137 onto the first reflective surface 133 so that they are emitted to the second sub-regions of the field of view.

As described above, LIDAR sensors according to the proposed technique may enable superposition of one-dimensional scanning and two-dimensional scanning in the second operation mode. This is further illustrated in FIG. 8 showing the LIDAR sensor 600 when operated in a second operation mode in which the LIDAR sensor 600 is performing one-dimensional scanning and two-dimensional scanning in parallel (i.e. simultaneously).

Both light sources 131 and 132 as well as both reflective surfaces 133 and 134 are active. Therefore, the first light beams sequentially illuminate the first sub-regions of the LIDAR sensor's field of view for one-dimensionally scanning the environment in the field of view. Simultaneously, the second light beams sequentially illuminate the second sub-regions of the field of view for two-dimensionally scanning the environment in a portion of the field of view. This may enable a one-dimensional scan of the field of view at a high frame rate and at the same time a scan of the portion of the field of view with increased range and increased resolution.

Speaking more general, some examples of the present disclosure relate to a LIDAR sensor comprising an optical transmitter (for illuminating the environment in the field of view) and an optical receiver (for receiving reflections from the environment in the field of view). The optical transmitter and the optical receiver are configured to, when operated in a first operation mode, (exclusively) one-dimensionally scan the environment in the field of view. When operated in a second operation mode, the optical transmitter and the optical receiver are configured to two-dimensionally scan the environment in at least a portion of the field of view. For example, when operated in the second operation mode, the optical transmitter and the optical receiver may be configured to two-dimensionally scan the environment in at least the portion of the field of view in combination with (in addition to/simultaneously to/in parallel to) one-dimensionally scanning the environment in the field of view. Alternatively, when operated in the second operation mode, the optical transmitter and the optical receiver may be configured to exclusively two-dimensionally scan the environment in at least the portion of the field of view. As described above, the LIDAR sensor may be configured to switch operation from the first operation mode to the second operation mode upon reception of control data indicating a region of interest in the environment, wherein the portion of the field of view corresponds to the region of interest.

Figure 9:
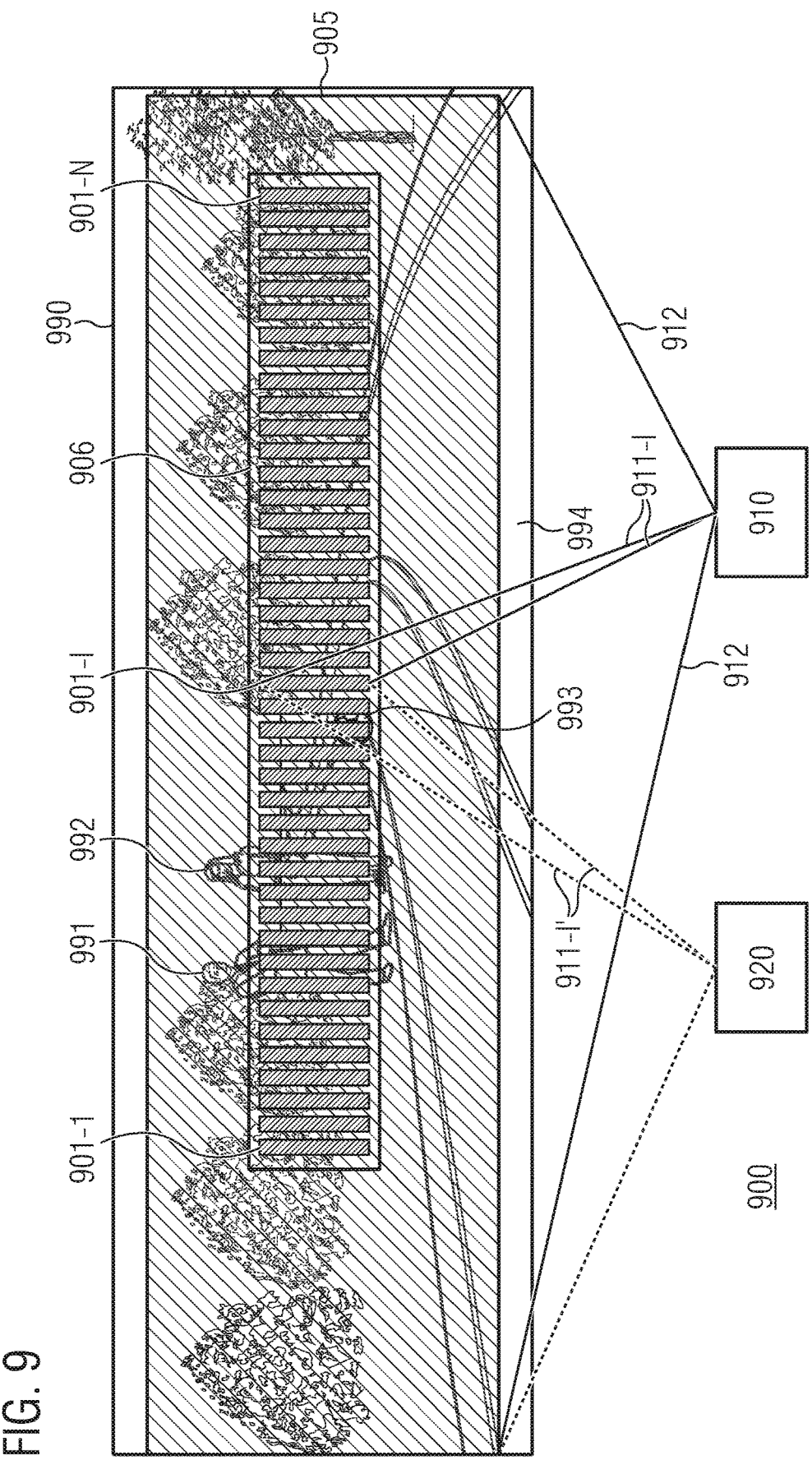
FIG. 9 illustrates a sixth example of a LIDAR sensor sensing an environment.

Another exemplary LIDAR sensor 900 for sensing an environment 990 is illustrated in FIG. 9. The LIDAR sensor 900 comprises an optical transmitter 910 and an optical receiver 920. The LIDAR sensor 900 exhibits a field of view 905.

The optical transmitter 910 may be operated in two different operation modes.

When operated in a first operation mode, the optical transmitter 910 is configured to (exclusively) simultaneously illuminate the full field of view 905 for sensing the environment 990 simultaneously in the full field of view. For example, the optical transmitter 910 may be configured to selectively emit light 912 into the full field of view 905 for simultaneously sensing the full environment 990. Simultaneously illuminating the full field of view for sensing the environment 990 simultaneously in the full field of view 905 is also known as "Flash LIDAR". For example, a single light beam or a plurality of light beams may be used to simultaneously illuminate the full field of view.

The optical receiver 920 is configured to receive reflections from the environment 990 in the field of view 905 after the illumination by the optical transmitter 910. For example, the optical receiver 920 may comprise a photodetector (not illustrated) configured to receive reflections of the light from the environment 990. The photodetector may, e.g., be a two-dimensional array of light-sensitive sensor elements.

Based on an illumination time of the full field of view 905 and reception times of the reflections from the environment 990 in the full field of view 905, distances of the LIDAR sensor 900 to the objects located in the environment 990 may be determined. For example, distances to the ball 993 or the two people 991 and 992 at the roadside in the environment 990 may be determined simultaneously.

When operated in a second operation mode, the optical transmitter 910 is configured to sequentially illuminate sub-regions 901-1, . . . , 901-N of the field of view 905 for one-dimensionally scanning the environment 990 in a portion 906 of the field of view 905. The portion 906 of the field of view 905 is smaller than the full field of view 905. For example, the optical transmitter 910 may be configured to selectively emit (pulsed) light beams into the sub-regions 901-1, . . . , 901-N of the field of view 905 for one-dimensionally scanning the portion 906 of the field of view 905. An exemplary illumination of the sub-region 901-I among the plurality of sub-regions 901-1, . . . , 901-N via a light beam 911-I is illustrated in FIG. 9.

A second illumination intensity used for illuminating the sub-regions 901-1, . . . , 901-N of the field of view 905 is higher than a first illumination intensity used for illuminating the full field of view 905.

In the example of FIG. 9, the sub-regions 901-1, . . . , 901-N are elongated sub-regions of the field of view 905 that extend orthogonal to the horizontal axis (i.e. the sub-regions 901-1, . . . , 901-N extend substantially in the vertical direction). In other words, the LIDAR sensor 900 is configured to one-dimensionally scan the portion 906 of the field of view 905 along the horizontal axis.

However, the LIDAR sensor 900 is not limited to one-dimensionally scanning the field of view 905 along the horizontal axis. In general, the LIDAR sensor 900 may be configured to one-dimensionally scan a portion 90 of the field of view 905 along any desired (predetermined) axis. For example, the LIDAR sensor 900 may be configured to one-dimensionally scan a portion of the field of view 905 along the vertical axis. Accordingly, the sub-regions may be elongated sub-regions of the field of view 905 that extend orthogonal to the vertical axis (i.e. the sub-regions may extend substantially in the horizontal direction). An exemplary illumination of a sub-region 901-I among the plurality of sub-regions 901-1, . . . , 901-N via a light beam 911-I is illustrated in FIG. 9.

For illuminating the sub-regions 901-1, . . . , 901-N, the light beams may have a substantially rectangular cross-section in a plane orthogonal to their respective beam direction (i.e. the light beams may be line- or strip shaped). However, the optical transmitter 910 is not limited to using rectangular sub-regions 901-1, . . . , 901-N. In general, the sub-regions 901-1, . . . , 901-N (and, hence, also the light beams) may exhibit any cross section (e.g. angular, quadratic, elongated, strip-shaped etc.).

The light used for illuminating the full field of view and the light beams used for illuminating the sub-regions 901-1, . . . , 901-N may, e.g., exhibit different polarizations and/or different wavelengths. For example, the light and the light beams may be infrared light (beams). The light and the light beams may, e.g., be laser light (beams).

The optical receiver 920 is further configured to receive reflections from the sub-regions 901-1, . . . , 901-N after their respective illumination by the optical transmitter 910. For example, the photodetector of the optical receiver 920 may be configured to receive reflections of the light beams from the environment 990. Similarly to what is described above, a distance to an object located in the environment 990 at the position of the illuminated sub-region 901-I may be determined based on an illumination time of the sub-region 901-I and a reception time of the reflection 911-I' from the illuminated sub-region 901-I.

The LIDAR sensor 900 may allow to sense the environment using different sensing conditions. The simultaneous scan of the full field of view 905 may allow to scan the environment 990 in the field of view 905 at a high framerate. The one-dimensional scan of the environment using the sub-regions may allow a scan of the portion 906 of the field of view 905 with increased range and increased resolution along the scan axis (e.g. the horizontal axis in the example of FIG. 9).

When operated in the second operation mode, the optical transmitter 910 may, e.g., be configured to illuminate the sub-regions 901-1, . . . , 901-N of the field of view 905 in combination with simultaneously illuminating the full field of view 905. In other words, the optical transmitter 910 may be configured to superimpose the sequential illumination of the sub-regions 901-1, . . . , 901-N and the simultaneous illumination of the full field of view 905.

Accordingly, the photodetector of the optical receiver 920 may simultaneously receive reflections from the full field of view and the sub-regions 901-1, . . . , 901-N of the field of view 905. This configuration of the second operation mode may enable a Flash Lidar sensing of the full field of view 905 at a high framerate and at the same time a scan of the portion 906 of the field of view 905 with increased range and increased resolution.

For example, the optical transmitter 910 may be configured to switch operation from the first operation mode to the second operation mode upon reception of control data indicating a region of interest in the environment 990. The LIDAR sensor 900 may be configured to adjust the portion 906 of the field of view 905 accordingly so that the portion 906 of the field of view 905 (substantially) corresponds to the region of interest. For example, if the LIDAR sensor 900 is used in a vehicle, the region of interest may be a road 994 as illustrated in FIG. 1. As illustrated in FIG. 1, the portion 906 of the field of view 905 substantially covers the road 994. Accordingly, objects on the road surface (such as the ball 193) may be detected already at long distances in the second operation mode. The control data may, e.g., be determined based on the Flash LIDAR sensing of the environment in the first operation mode. For example, a processing circuit (not illustrated) of the LIDAR sensor 900 or an external processing circuit (not illustrated) may generate the control data. Alternatively or additionally, the control data may, e.g., be determined based on measurement data of one or more other sensors (e.g. a radar sensor, a video camera, etc.).

Figure 10:
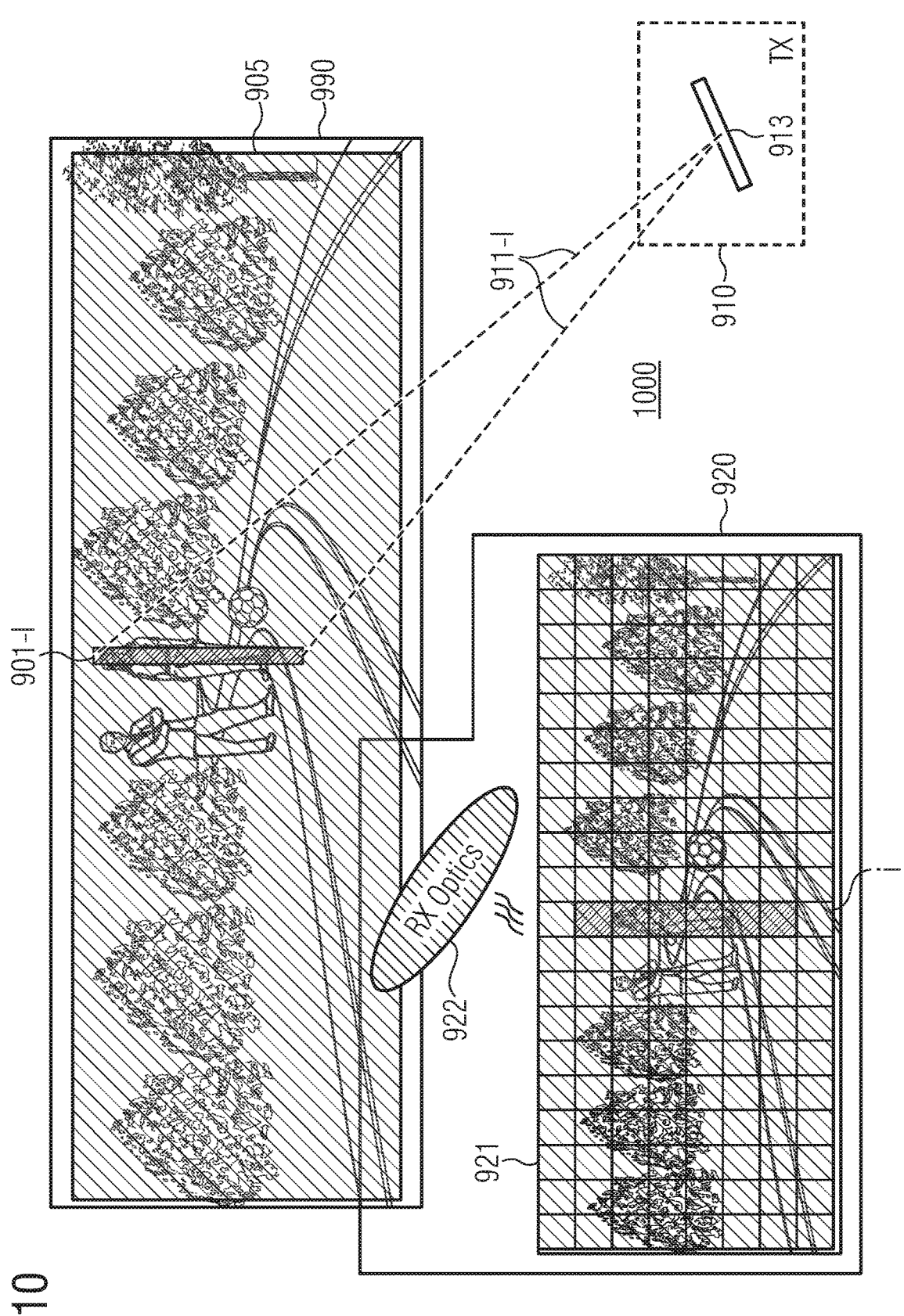
FIG. 10 illustrates a seventh example of a LIDAR sensor sensing an environment.

FIG. 10 illustrates a more detailed example of a LIDAR sensor 1000 for sensing the environment 990. Compared to LIDAR sensor 900 illustrated in FIG. 9, LIDAR sensor 1000 shows more details of the optical transmitter 910 and the optical receiver 920. Therefore, it is mainly referred to the differences of LIDAR sensor 1000 in comparison to LIDAR sensor 900. For reasons of simplicity only one sub-region 901-I is illustrated in FIG. 10.

The optical transmitter 910 of LIDAR sensor 1000 comprises a reflective surface 913 for emitting the light beam 911-I sub-regions 901-I. The reflective surface 913 is configured to oscillate about a rotation axis.

Further, the optical transmitter 910 of LIDAR sensor 1000 comprises a light source (not illustrated) emitting the light for illuminating the full field of view 905.

The optical receiver 920 of LIDAR sensor 1000 comprises a photodetector 921 implemented as a two-dimensional array of light-sensitive sensor elements. Further, the optical receiver 920 comprises an optical system 922 (e.g. comprising one or more lenses) configured to project the reflections from the illuminated environment onto the photodetector 921.

Each light-sensitive sensor element of the photodetector 921 is only capable of receiving light from a certain solid angle. To illustrate this, the representation of the light-sensitive sensor element of the photodetector 921 is underlaid in FIG. 10 with a representation of the environment 990. As can be seen from FIG. 10, each light-sensitive sensor element of the photodetector 921 is only capable of receiving light from a certain portion of the environment 990.

Accordingly, if the full field of view 905 is simultaneously illuminated, all light-sensitive sensor element of the photodetector 921 may receive reflections. Due to the elongated shape along the vertical axis of the light beam 911-I for illuminating the sub-region 901-I also the reflection from the sub-region 901-I exhibits an elongated shape along the vertical axis. Therefore, the reflection hits several light-sensitive sensor elements of a column i of light-sensitive sensor elements at the photodetector 921.

The (high resolution) two-dimensional photodetector 921 of LIDAR sensor 1000 may support Flash LIDAR sensing in the first operation mode as well as one-dimensional scanning in the second operation mode.

Figure 11:
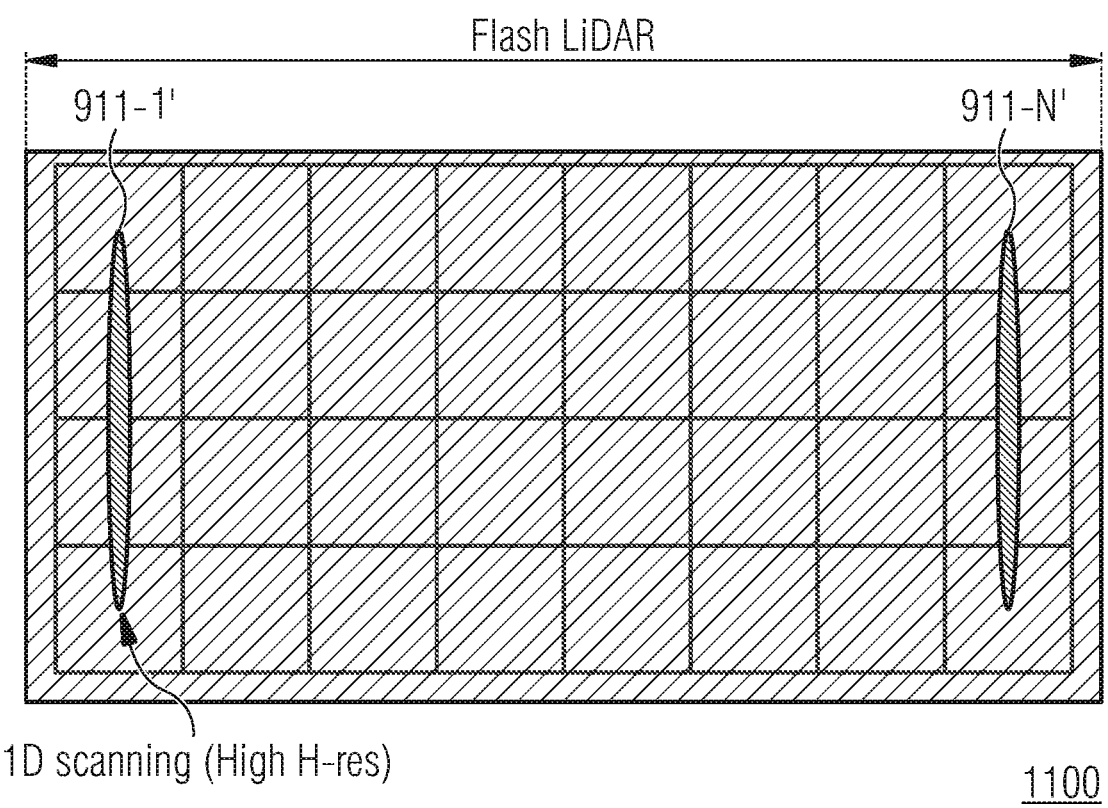
FIG. 11 illustrates another photodetector for a LIDAR sensor.

FIG. 11 illustrates a surface of an exemplary photodetector 1100 for a LIDAR sensor according to the proposed technique. The photodetector 1100 is implemented as a two-dimensional array of light-sensitive sensor elements.

Since the full field of view is simultaneously illuminated during Flash LIDAR sensing, all light-sensitive sensor element of the photodetector 1100 receive reflections of the light used for the Flash LIDAR sensing.

Further illustrated are two reflections 911-1' and 911-N' of light beams for one-dimensionally scanning the environment in portion of the field of view (e.g. as in the second operation mode described above). The two illustrated reflections 911-1' and 911-N' are reflections of the first and the last beam of a sequence of the light beams. As indicated in FIG. 11, the reflections of the light beams hit the photodetector 1100 at varying positions along the horizontal axis as the sequence passes through. In other words, the reflections of the first light beams hit varying columns of the light-sensitive sensor elements as the sequence passes through. The one-dimensional scanning of the environment along the horizontal axis may allow an increased range for object detection at a high horizontal resolution.

A LIDAR sensor according to proposed technique may enable high horizontal resolution and an enhanced range for object detection in the one-dimensional scanning mode. Further, an enhanced frame rate may be achieved in the Flash LIDAR sensing mode. The one-dimensional scanning mode is optional. A LIDAR sensor according to proposed technique may operate in the Flash LIDAR sensing mode only.

Figure 12:
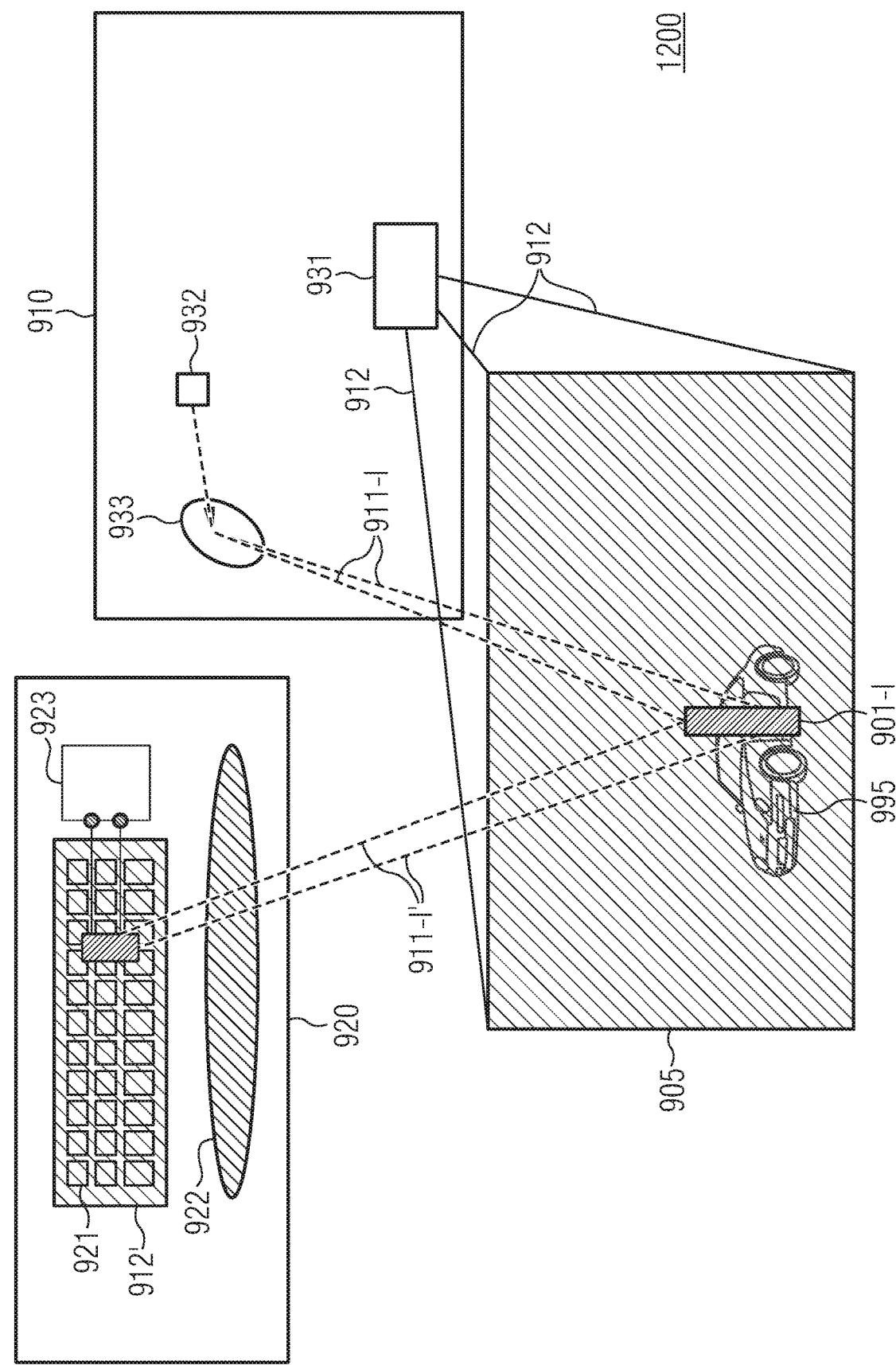
FIG. 12 illustrates an eighth example of a LIDAR sensor sensing an environment.

FIG. 12 illustrates another example of a LIDAR sensor 1200 showing more structural details than the LIDAR sensors 900 and 1000 described above. Again, the LIDAR sensor 1200 comprises an optical transmitter 910 and an optical receiver 920.

The optical transmitter 910 comprises a first light source 931 configured to controllably emit light 912 into the full field of view 905. For example, the first light source 931 may comprise one or more laser diodes (e.g. edge emitting laser diodes) emitting one or more laser beams and an optical system that illuminates the full field of view 905 using the one or more laser beams.

Further, the optical transmitter 910 comprises a reflective surface 933 (e.g. a MEMS mirror) configured to oscillate about a rotation axis.

A second light source 932 of the optical transmitter 910 is configured to controllably emit the light beams onto the reflective surface 933 so that the reflective surface 933 emits the light beams into the sub-regions of the field of view 905. This is exemplarily illustrated in FIG. 12 for a light beam 911-I. The light beam 911-I is emitted onto the reflective surface 933 such that the reflective surface 933 emits the light beam 911-I into sub-region 901-I of the LIDAR sensor's field of view.

For example, a control circuit of the LIDAR sensor 1200 (not illustrated) may be configured to control the emission time of the second light source 932 such that the reflective surface 933 emits the light beams to the environment as described above. Similarly, the control circuit may control the emission time of the first light source 931 for selectively illuminating the full field of view 905. The light 912 and the light beam 911-I may, e.g., exhibit different polarizations and/or different wavelengths.

In the example of FIG. 12, an object 995 is present in the environment at the location of the sub-region 901-I. The light for illuminating the full field of is reflected back to the LIDAR sensor 1200 by inter alia the object 995 (indicated by the extensive reflection 912'). Further, the light beam 111-I is reflected back to the LIDAR sensor 1200 by the object 995. The reflections 911-I' and 912' are sensed by the optical receiver 920 of the LIDAR sensor. In particular, an optical system 922 of the optical receiver 920 (e.g. comprising one or more lenses) is configured to project the reflections 911-I' and 912' onto the photodetector 921. The photodetector 921 is again implemented as a two-dimensional array of light-sensitive sensor elements.

The individual light-sensitive sensor elements may be read out by a read-out circuit 923. The reception times of the individual reflections from the illuminated regions of the field of view may be determined based on the read-out signals provided by the read-out circuit 923. Together with the emission times of the first and second light sources 931 and 932 for the light and the light beams, a distance of the LIDAR sensor 400 to the object 995 may be determined.

The LIDAR sensor 1200 may allow Flash LIDAR sensing and optionally one-dimensional scanning of the environment in accordance with the proposed LIDAR technique.

For further illustrating the operation of the LIDAR sensors described above, FIGS. 13 to 15 illustrate flowcharts of exemplary methods for LIDAR sensors.

Figure 13:
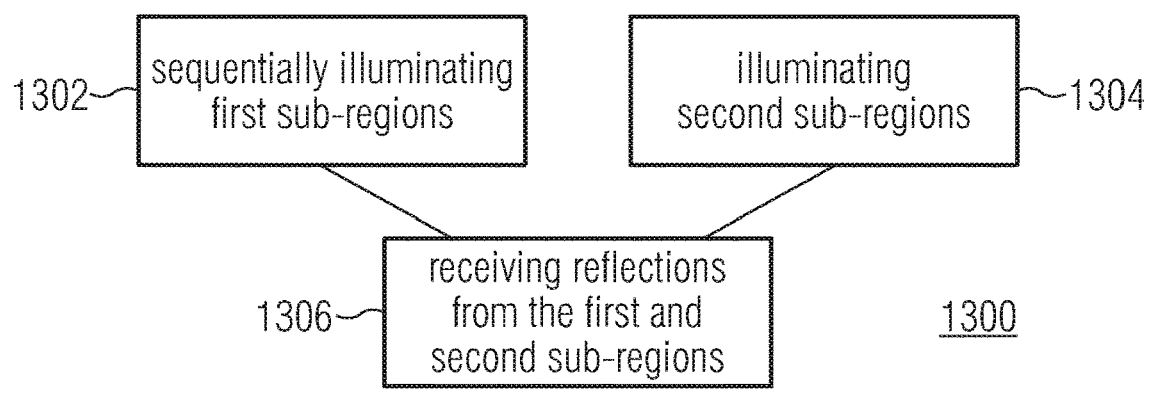
FIG. 13 illustrates a flowchart of a first example of a method for a LIDAR sensor.

FIG. 13 illustrates a flowchart of a first exemplary method 1300 for a LIDAR sensor. Method 1300 comprises sequentially illuminating 1302 first sub-regions of a field of view in a first operation mode for one-dimensionally scanning the environment in the field of view. Further, method 1300 comprises illuminating 1304 second sub-regions of the field of view in a second operation mode for scanning the environment in a portion of the field of view. A second illumination intensity used for illuminating the second sub-regions is higher than a first illumination intensity used for illuminating the first sub-regions. Additionally, method 1300 comprises receiving 1306 reflections from the first and second sub regions.

Figure 14:
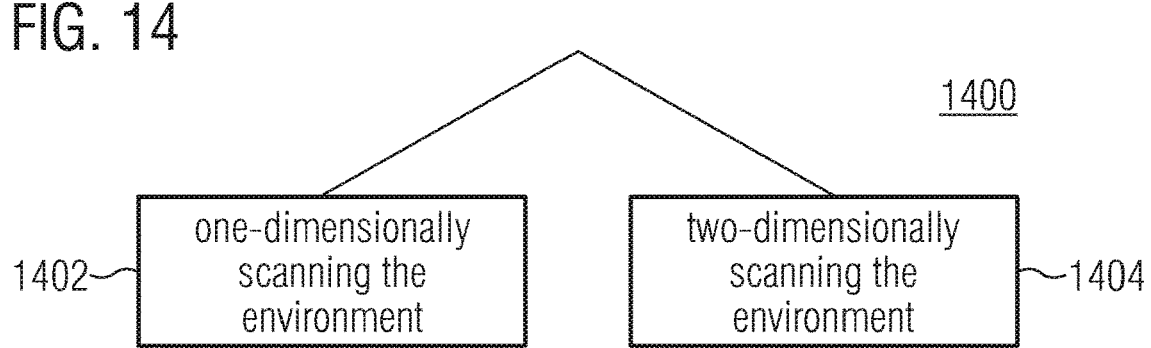
FIG. 14 illustrates a flowchart of a second example of a method for a LIDAR sensor.

A flowchart of a second exemplary method 1400 for a LIDAR sensor is illustrated in FIG. 14. Method 1400 comprises one-dimensionally scanning 1402 the environment in a field of view in a first operation mode. Further, method 1400 comprises two-dimensionally scanning 1404 the environment in at least a portion of the field of view in a second operation mode.

Figure 15:
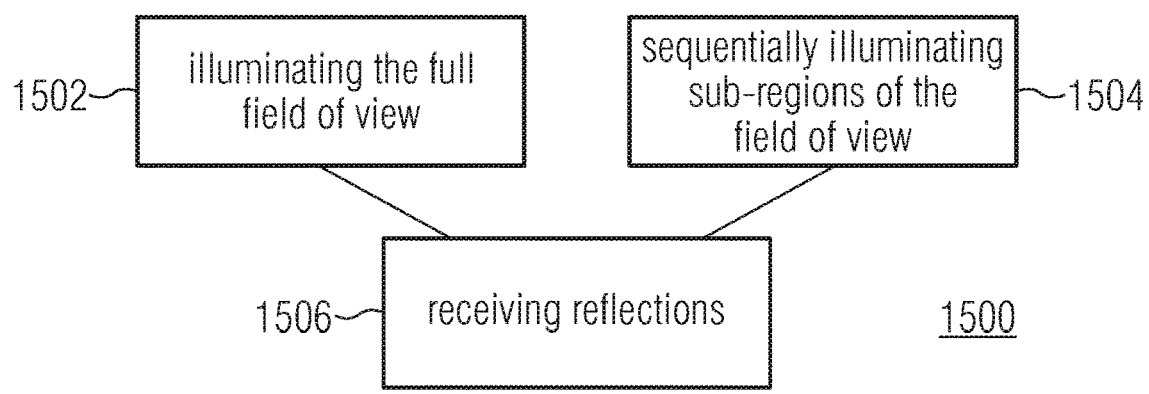
FIG. 15 illustrates a flowchart of a third example of a method for a LIDAR sensor.

FIG. 15 illustrates a flowchart of a third exemplary method 1500 for a LIDAR sensor. Method 1500 comprises simultaneously illuminating 1502 a full field of view in a first operation mode for sensing the environment simultaneously in the full field of view. In addition, method 1500 comprises sequentially illuminating 1504 sub-regions of the field of view in a second operation mode for one-dimensionally scanning the environment in a portion of the field of view. Method 1500 further comprises receiving 1506 reflections from the environment.

More details and aspects of methods 1300, 1400 and 1500 are explained in connection with the proposed technique or one or more example embodiments described above (e.g. FIGS. 1 to 12). The methods may comprise one or more additional optional features corresponding to one or more aspects of the proposed technique or one or more examples described above.

The examples as described herein may be summarized as follows:

Some examples relate to a LIDAR sensor. The LIDAR sensor comprises an optical transmitter configured to, when operated in a first operation mode, sequentially illuminate first sub-regions of a field of view for one-dimensionally scanning the environment in the field of view. When operated in a second operation mode, the optical transmitter is configured to illuminate second sub-regions of the field of view for scanning the environment in a portion of the field of view. A second illumination intensity used for illuminating the second sub-regions is higher than a first illumination intensity used for illuminating the first sub-regions. The LIDAR sensor further comprises an optical receiver configured to receive reflections from the first and second sub regions.

According to some examples, the second sub-regions cover smaller portions of the field of view than the first sub-regions In some examples, when operated in the second operation mode, the optical transmitter is configured to simultaneously illuminate the second sub-regions and the first sub-regions.

In alternative examples, when operated in the second operation mode, the optical transmitter is configured to exclusively illuminate the second sub-regions.

According to some examples, when operated in the second operation mode, the optical transmitter is configured to illuminate the second sub-regions such that the environment in the portion of the field of view is scanned two-dimensionally.

In some examples, the optical transmitter is configured to switch operation from the first operation mode to the second operation mode upon reception of control data indicating a region of interest in the environment, wherein the portion of the field of view corresponds to the region of interest.

According to some examples, the optical transmitter is configured to selectively emit first light beams into the first sub-regions of the field of view for one-dimensionally scanning the environment in the field of view. Further, the optical transmitter is configured to selectively emit second light beams into the second sub-regions of the field of view for scanning the portion of the field of view. A light intensity of the second light beams is higher than a light intensity of the first light beams. The optical receiver comprises a photodetector configured to receive reflections of the first and second light beams from the environment.

In some examples, the photodetector is a two-dimensional or one-dimensional array of light-sensitive sensor elements.

According to some examples, the optical transmitter comprises a first reflective surface configured to oscillate about a first rotation axis, and a first light source configured to controllably emit the first light beams via an optical system onto the first reflective surface so that the first reflective surface emits the first light beams into the first sub-regions of the field of view. The optical transmitter further comprises a second reflective surface configured to oscillate about a second rotation axis, and a second light source configured to controllably emit the second light beams onto the second reflective surface so that the second reflective surface emits the second light beams via the optical system onto the first reflective surface. The first reflective surface is configured to emit the second light beams into the second sub-regions of the field of view.

In some examples, the optical system comprises an optical element configured to reflect the second light beams received from the second reflective surface onto the first reflective surface, wherein the optical element is optically transparent for the first light beams so that the first light beams emitted by the first light source transmit through the optical element to the first reflective surface.

According to some examples, the optical system further comprises an optical lens system arranged between the optical element and at least one of the first and second reflective surfaces.

In some examples, the first rotation axis is orthogonal to the second rotation axis.

In alternative examples, the optical transmitter comprises a reflective surface configured to oscillate about a rotation axis, and a first light source configured to controllably emit the first light beams via an optical system onto the reflective surface so that the reflective surface emits the first light beams into the first sub-regions of the field of view. The optical transmitter additionally comprises a linear array of second light sources each configured to controllably emit a respective second light beam via the optical system onto the reflective surface so that that the reflective surface emits the second light beams into the second sub-regions of the field of view.

According to some examples, the optical system comprises an optical element configured to reflect the second light beams received from the linear array of second light sources onto the reflective surface, wherein the optical element is optically transparent for the first light beams so that the first light beams emitted by the first light source transmit through the optical element to the reflective surface.

In some examples, the optical system further comprises an optical lens system arranged between the optical element and at least one of the reflective surface and the linear array of second light sources.

According to some examples, the linear array of second light sources is arranged along a spatial axis orthogonal to the rotation axis.

In some examples, the first and second light beams exhibit different polarizations and/or different wavelengths.

According to some examples, a cross-section of one of the second light beams in a plane orthogonal to its beam direction is smaller than a cross-section of one of the first light beams in a plane orthogonal to its beam direction.

In some examples, a cross-section of one of the second light beams in a plane orthogonal to its beam direction is rotated with respect to a cross-section of one of the first light beams in a plane orthogonal to its beam direction.

Other examples relate to a method for a LIDAR sensor. The method comprises sequentially illuminating first sub-regions of a field of view in a first operation mode for one-dimensionally scanning the environment in the field of view. Further, the method comprises illuminating second sub-regions of the field of view in a second operation mode for scanning the environment in a portion of the field of view. A second illumination intensity used for illuminating the second sub-regions is higher than a first illumination intensity used for illuminating the first sub-regions. Additionally, the method comprises receiving reflections from the first and second sub regions.

Some example relate to another LIDAR sensor comprising an optical transmitter and an optical receiver. The optical transmitter and the optical receiver are configured to, when operated in a first operation mode, one-dimensionally scan the environment in a field of view. When operated in a second operation mode, the optical transmitter and the optical receiver are configured to two-dimensionally scan the environment in at least a portion of the field of view.

In some examples, the LIDAR sensor is configured to switch operation from the first operation mode to the second operation mode upon reception of control data indicating a region of interest in the environment, and wherein the portion of the field of view corresponds to the region of interest.

According to some examples, when operated in the second operation mode, the optical transmitter and the optical receiver are configured to two-dimensionally scan the environment in at least the portion of the field of view in combination with one-dimensionally scanning the environment in the field of view.

In some examples, when operated in the second operation mode, the optical transmitter and the optical receiver are configured to exclusively two-dimensionally scan the environment in at least the portion of the field of view.

Further examples relate to another method for a LIDAR sensor. The method comprises one-dimensionally scanning the environment in a field of view in a first operation mode. Further, the method comprises two-dimensionally scanning the environment in at least a portion of the field of view in a second operation mode.

Some examples relate to a further LIDAR sensor. The LIDAR sensor comprises a first reflective surface configured to oscillate about a first rotation axis. Further, the LIDAR sensor comprises a first light source configured to controllably emit first light beams via an optical system onto the first reflective surface so that the first reflective surface emits the first light beams into the environment. The LIDAR sensor comprises a second reflective surface configured to oscillate about a second rotation axis. Additionally, the LIDAR sensor comprises a second light source configured to controllably emit second light beams onto the second reflective surface so that the second reflective surface emits the second light beams via the optical system onto the first reflective surface. The first reflective surface is configured to emit the second light beams into the environment.

According to some examples, the optical system comprises an optical element configured to reflect the second light beams received from the second reflective surface to the first reflective surface, wherein the optical element is optically transparent for the first light beams so that the first light beams emitted by the first light source transmit through the optical element to the first reflective surface.

Some examples relate to a still further LIDAR sensor. The LIDAR sensor comprises a reflective surface configured to oscillate about a rotation axis. Additionally, the LIDAR sensor comprises a first light source configured to controllably emit first light beams via an optical system onto the first reflective surface so that the first reflective surface emits the first light beams into the environment. Further, the LIDAR sensor comprises a linear array of second light sources each configured to controllably emit a respective second light beam via an optical system onto the first reflective surface so that that the first reflective surface emits the second light beams into the environment.

According to some examples, the optical system comprises an optical element configured to reflect the second light beams received from the linear array of second light sources to the reflective surface, wherein the optical element is optically transparent for the first light beams so that the first light beams emitted by the first light source transmit through the optical element to the reflective surface.

Another example relates to a LIDAR sensor. The LIDAR sensor comprises an optical transmitter configured to, when operated in a first operation mode, simultaneously illuminate a full field of view for sensing the environment simultaneously in the full field of view. When operated in a second operation mode, the optical transmitter is configured to sequentially illuminate sub-regions of the field of view for one-dimensionally scanning the environment in a portion of the field of view. The LIDAR sensor further comprises an optical receiver configured to receive reflections from the environment.

In some examples, when operated in the second operation mode, the optical transmitter is configured to illuminate the sub-regions in combination with simultaneously illuminating the full field of view.

According to some examples, the optical transmitter is configured to switch operation from the first operation mode to the second operation mode upon reception of control data indicating a region of interest in the environment, wherein the portion of the field of view corresponds to the region of interest.

In some examples, the optical transmitter is configured to selectively emit light into the full field of view for sensing the environment simultaneously in the full field of view. Further, the optical transmitter is configured to selectively emit light beams into the sub-regions of the field of view for one-dimensionally scanning the portion of the field of view. The optical receiver comprises a photodetector configured to receive reflections of the light and the light beams from the environment.

According to some examples, the photodetector is a two-dimensional array of light-sensitive sensor elements.

In some examples, the optical transmitter comprises a first light source configured to controllably emit the light into the full field of view. Further, the optical transmitter comprises a reflective surface configured to oscillate about a rotation axis, and a second light source configured to controllably emit the light beams onto the reflective surface so that the reflective surface emits the light beams into the sub-regions of the field of view.

According to some examples, the light and the light beams exhibit different polarizations and/or different wavelengths.

Some examples relate to a further method for a LIDAR sensor. The method comprises simultaneously illuminating a full field of view in a first operation mode for sensing the environment simultaneously in the full field of view. In addition, the method comprises sequentially illuminating sub-regions of the field of view in a second operation mode for one-dimensionally scanning the environment in a portion of the field of view. The method further comprises receiving reflections from the environment.

Further, some example relates to a LIDAR sensor comprising a first light source configured to controllably emit light into a full field of view of the LIDAR sensor. The LIDAR sensor additionally comprises a reflective surface configured to oscillate about a rotation axis, and a second light source configured to controllably emit light beams onto the reflective surface so that the reflective surface sequentially emits the light beams into sub-regions of the field of view.

In some examples, the LIDAR sensor further comprises a photodetector configured to receive reflections of the light and the light beams from the environment.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A Light Detection And Ranging (LIDAR) sensor, comprising:
   an optical transmitter configured to operate in a first operation mode and a second operation mode,
   wherein when operated in the first operation mode, sequentially transmit first light beams to sequentially illuminate first sub-regions of a field of view at a first illumination intensity to one-dimensionally scan an environment in the field of view, and
   wherein when operated in the second operation mode, sequentially transmit second light beams to illuminate second sub-regions of the field of view at a second illumination intensity to scan the environment in a portion of the field of view, wherein the second illumination intensity used for illuminating the second sub-regions is higher than the first illumination intensity used for illuminating the first sub-regions; and
   an optical receiver configured to receive reflections from the first sub regions and the second sub regions,
   wherein a cross-section of each of the second light beams in a plane orthogonal to its beam direction is smaller than a cross-section of each of the first light beams in a plane orthogonal to its beam direction.

2. The LIDAR sensor of claim 1, wherein the second sub-regions cover smaller portions of the field of view than the first sub-regions.

3. The LIDAR sensor of claim 1, wherein, when operated in the second operation mode, the optical transmitter is configured to simultaneously illuminate the second sub-regions and the first sub-regions of the field of view.

4. The LIDAR sensor of claim 1, wherein, when operated in the second operation mode, the optical transmitter is configured to exclusively illuminate the second sub-regions.

5. The LIDAR sensor of claim 1, wherein, when operated in the second operation mode, the optical transmitter is configured to illuminate the second sub-regions such that the environment in the portion of the field of view is scanned two-dimensionally by the optical transmitter.

6. The LIDAR sensor of claim 1, wherein the optical transmitter is configured to switch operation from the first operation mode to the second operation mode upon reception of control data indicating a region of interest in the environment, and wherein the portion of the field of view corresponds to the region of interest.

7. The LIDAR sensor of claim 1, wherein the optical transmitter is configured to:
   selectively emit the first light beams at the first illumination intensity into the first sub-regions of the field of view for one-dimensionally scanning the environment in the field of view; and
   selectively emit the second light beams at the second illumination intensity into the second sub-regions of the field of view for scanning the portion of the field of view,
   wherein the optical receiver comprises a photodetector configured to receive reflections of the first light beams and the second light beams from the environment.

8. The LIDAR sensor of claim 7, wherein the photodetector is a two-dimensional or one-dimensional array of light-sensitive sensor elements.

9. The LIDAR sensor of claim 7, wherein the optical transmitter comprises:
   a first reflective surface configured to oscillate about a first rotation axis;
   a first light source configured to controllably emit the first light beams via an optical system onto the first reflective surface so that the first reflective surface emits the first light beams into the first sub-regions of the field of view;
   a second reflective surface configured to oscillate about a second rotation axis; and
   a second light source configured to controllably emit the second light beams onto the second reflective surface so that the second reflective surface emits the second light beams via the optical system onto the first reflective surface,
   wherein the first reflective surface is configured to emit the second light beams into the second sub-regions of the field of view.

10. The LIDAR sensor of claim 9, wherein the optical system comprises:
    an optical element configured to reflect the second light beams received from the second reflective surface onto the first reflective surface,
    wherein the optical element is optically transparent for the first light beams so that the first light beams emitted by the first light source transmit through the optical element to the first reflective surface.

11. The LIDAR sensor of claim 10, wherein the optical system further comprises an optical lens system arranged between the optical element and at least one of the first reflective surface and the second reflective surface.

12. The LIDAR sensor of claim 9, wherein the first rotation axis is orthogonal to the second rotation axis.

13. The LIDAR sensor of claim 7, wherein the optical transmitter comprises:
   a reflective surface configured to oscillate about a rotation axis;
   a first light source configured to controllably emit the first light beams via an optical system onto the reflective surface so that the reflective surface emits the first light beams into the first sub-regions of the field of view; and
   a linear array of second light sources each configured to controllably emit a respective second light beam of the second light beams via the optical system onto the reflective surface so that that the reflective surface emits the second light beams into the second sub-regions of the field of view.

14. The LIDAR sensor of claim 13, wherein the optical system comprises:
   an optical element configured to reflect the second light beams received from the linear array of second light sources onto the reflective surface,
   wherein the optical element is optically transparent for the first light beams so that the first light beams emitted by the first light source transmit through the optical element to the reflective surface.

15. The LIDAR sensor of claim 14, wherein the optical system further comprises an optical lens system arranged between the optical element and at least one of the reflective surface and the linear array of second light sources.

16. The LIDAR sensor of claim 13, wherein the linear array of second light sources is arranged along a spatial axis orthogonal to the rotation axis.

17. The LIDAR sensor of claim 7, wherein the first light beams and the second light beams exhibit at least one of different polarizations or different wavelengths.

18. The LIDAR sensor of claim 7, wherein a cross-section of one of the second light beams in a plane orthogonal to its beam direction is rotated with respect to a cross-section of one of the first light beams in a plane orthogonal to its beam direction.

19. A method for a Light Detection And Ranging (LIDAR) sensor, the method comprising:
   sequentially transmitting first light beams to sequentially illuminate first sub-regions of a field of view at first illumination intensity in a first operation mode for one-dimensionally scanning an environment in the field of view;
   transmitting second light beams to illuminate second sub-regions of the field of view at a second illumination intensity in a second operation mode for scanning the environment in a portion of the field of view, wherein the second illumination intensity used for illuminating the second sub-regions is higher than the first illumination intensity used for illuminating the first sub-regions; and
   receiving reflections from the first sub regions and the second sub regions,
   wherein a cross-section of each of the second light beams in a plane orthogonal to its beam direction is smaller than a cross-section of each of the first light beams in a plane orthogonal to its beam direction.

20. A Light Detection And Ranging (LIDAR) sensor, comprising:
   an optical transmitter; and
   an optical receiver,
   wherein the optical transmitter and the optical receiver are configured to:
      when operated in a first operation mode, one-dimensionally scan an environment in a field of view such that the field of view is scanned exclusively in one-dimension during the first operation mode according to a one-dimensional scanning pattern; and
      when operated in a second operation mode, two-dimensionally scan the environment in at least a portion of the field of view according to a two-dimensional scanning pattern.

21. The LIDAR sensor of claim 20, wherein the LIDAR sensor is configured to switch operation from the first operation mode to the second operation mode upon reception of control data indicating a region of interest in the environment, and wherein the portion of the field of view corresponds to the region of interest.

22. The LIDAR sensor of claim 20, wherein, when operated in the second operation mode, the optical transmitter and the optical receiver are configured to two-dimensionally scan the environment in at least the portion of the field of view in combination with one-dimensionally scanning the environment in the field of view.

23. The LIDAR sensor of claim 20, wherein, when operated in the second operation mode, the optical transmitter and the optical receiver are configured to exclusively two-dimensionally scan the environment in at least the portion of the field of view.

24. A method for a Light Detection And Ranging (LIDAR) sensor, the method comprising:
   one-dimensionally scanning the environment in a field of view in a first operation mode such that the field of view is scanned exclusively in one-dimension during the first operation mode according to a one-dimensional scanning pattern; and
   two-dimensionally scanning the environment in at least a portion of the field of view in a second operation mode according to a two-dimensional scanning pattern.

25. A Light Detection And Ranging (LIDAR) sensor, comprising:
   a first reflective surface configured to oscillate about a first rotation axis;
   a first light source configured to controllably emit first light beams via an optical system onto the first reflective surface so that the first reflective surface emits the first light beams into an environment;
   a second reflective surface configured to oscillate about a second rotation axis; and
   a second light source configured to controllably emit second light beams onto the second reflective surface so that the second reflective surface emits the second light beams via the optical system onto the first reflective surface,
   wherein the first reflective surface is configured to emit the second light beams into the environment.

26. The LIDAR sensor of claim 25, wherein the optical system comprises:
   an optical element configured to reflect the second light beams received from the second reflective surface to the first reflective surface,
   wherein the optical element is optically transparent for the first light beams so that the first light beams emitted by the first light source transmit through the optical element to the first reflective surface.

27. A Light Detection And Ranging (LIDAR) sensor, comprising: a reflective surface configured to oscillate about a rotation axis; a first light source configured to controllably emit first light beams via an optical system onto the reflective surface so that the reflective surface emits the first light beams into an environment; and a linear array of second light sources each configured to controllably emit a respective second light beam of second light beams via the optical system onto the reflective surface so that that the reflective surface emits the second light beams into the environment, wherein the linear array of second light sources is configured to selectively activate different portions of the second light sources to vary a projection position of the second light beams onto the reflective surface.

28. The LIDAR sensor of claim 27, wherein the optical system comprises:
an optical element configured to reflect the second light beams received from the linear array of second light sources to the reflective surface,
wherein the optical element is optically transparent for the first light beams so that the first light beams emitted by the first light source transmit through the optical element to the reflective surface.

29. A Light Detection And Ranging (LIDAR) sensor, comprising:
an optical transmitter configured to:
when operated in a first operation mode, simultaneously illuminate a full field of view for sensing an environment simultaneously in the full field of view; and
when operated in a second operation mode, sequentially illuminate sub-regions of the full field of view for one-dimensionally scanning the environment in a portion of the full field of view; and
an optical receiver configured to receive reflections from the environment.

30. The LIDAR sensor of claim 29, wherein, when operated in the second operation mode, the optical transmitter is configured to illuminate the sub-regions in combination with simultaneously illuminating the full field of view.

31. The LIDAR sensor of claim 29, wherein the optical transmitter is configured to switch operation from the first operation mode to the second operation mode upon reception of control data indicating a region of interest in the environment, wherein the portion of the full field of view corresponds to the region of interest.

32. The LIDAR sensor of claim 29, wherein the optical transmitter is configured to:
selectively emit light into the full field of view for simultaneously sensing an environment in the full field of view; and
selectively emit light beams into the sub-regions of the full field of view for one-dimensionally scanning the portion of the full field of view,
wherein the optical receiver comprises a photodetector configured to receive reflections of the light and the light beams from the environment.

33. The LIDAR sensor of claim 32, wherein the photodetector is a two-dimensional array of light-sensitive sensor elements.

34. The LIDAR sensor of claim 32, wherein the optical transmitter comprises:
a first light source configured to controllably emit the light into the full field of view;
a reflective surface configured to oscillate about a rotation axis; and
a second light source configured to controllably emit the light beams onto the reflective surface so that the reflective surface emits the light beams into the sub-regions of the full field of view.

35. The LIDAR sensor of claim 32, wherein the light and the light beams exhibit at least one of different polarizations or different wavelengths.

36. A method for a Light Detection And Ranging (LIDAR) sensor, comprising:
simultaneously illuminating a full field of view in a first operation mode for simultaneously sensing an environment in the full field of view;
sequentially illuminating sub-regions of the full field of view in a second operation mode for one-dimensionally scanning the environment in a portion of the full field of view; and
receiving reflections from the environment.

37. A Light Detection And Ranging (LIDAR) sensor, comprising:
a first light source configured to controllably emit light into a full field of view of the LIDAR sensor such that the emitted light simultaneously illuminates the full field of view for sensing an environment simultaneously in the full field of view;
a reflective surface configured to oscillate about a rotation axis; and
a second light source configured to controllably emit light beams onto the reflective surface so that the reflective surface sequentially emits the light beams to sub-regions of a portion of the full field of view.

38. The LIDAR sensor of claim 37, further comprising:
a photodetector configured to receive reflections of the light and the light beams from the environment.

39. The LIDAR sensor of claim 20, wherein:
when operated in the first operation mode, the optical transmitter is configured to sequentially transmit first light beams to sequentially illuminate first sub-regions of the field of view at a first illumination intensity to one-dimensionally scan the environment in the field of view, and
when operated in the second operation mode, the optical transmitter is configured to sequentially transmit the first light beams to sequentially illuminate the first sub-regions of the field of view at the first illumination intensity to one-dimensionally scan the environment in the field of view and sequentially transmit second light beams to illuminate second sub-regions of the field of view at a second illumination intensity to two-dimensionally scan the environment in the portion of the field of view,
the second light beams are superimposed onto the first light beams in the portion of the field of view such that each of the second sub-regions is simultaneously illuminated by at least one of the first light beams and at least one of the second light beams, and
the second illumination intensity used for illuminating the second sub-regions is higher than the first illumination intensity used for illuminating the first sub-regions.

40. The LIDAR sensor of claim 39, wherein, in the first operation mode, the first sub-regions are exclusively illuminated by the first light beams.

41. The LIDAR sensor of claim 25, wherein:
the first reflective surface is configured to receive the first light beams from the first light source and steer the first light beams into the environment such that the first light beams are steered exclusively into the environment in a first dimension, and
the second reflective surface is configured to receive the second light beams from the second light source and steer the second light beams in a second dimension,
the first reflective surface is configured to receive the second light beams from the second reflective surface and steer the second light beams in the first dimension, and the first reflective surface and the second reflective surface cooperatively steer the second light beams into the environment in the first and the second dimensions.

* * * * *